United States Patent
Takahashi et al.

(10) Patent No.: US 6,763,451 B1
(45) Date of Patent: Jul. 13, 2004

(54) MULTIPROCESSOR EXCHANGE PROVIDED WITH FLOATING FUNCTION

(75) Inventors: Nobuo Takahashi, Sendai (JP); Kei Shibuya, Sendai (JP); Akira Chiba, Sendai (JP); Hiroyuki Tetsuka, Sendai (JP); Satoshi Kawano, Sendai (JP); Kazuhiro Watanabe, Sendai (JP); Tsuyoshi Kawakita, Sendai (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 09/665,536

(22) Filed: Sep. 19, 2000

(30) Foreign Application Priority Data

Nov. 24, 1999 (JP) .......................................... 11-332614

(51) Int. Cl.[7] .......................... G06F 15/00; H04L 12/28
(52) U.S. Cl. ...................... 712/222; 370/395; 370/389; 712/225
(58) Field of Search .............................. 370/395.1, 389, 370/397, 396, 400, 401, 351, 522, 377, 378, 384, 386; 709/201, 223; 712/222, 225, 203; 710/129, 64

(56) References Cited

U.S. PATENT DOCUMENTS 6,128,687 A * 10/2000 Dao et al. .................... 710/305
6,212,187 B1 * 4/2001 Masuda ..................... 370/395.2
6,601,086 B1 * 7/2003 Howard et al. ............. 709/203

FOREIGN PATENT DOCUMENTS

| JP | 5-22761 | 1/1993 |
| JP | 9-200219 | 7/1997 |
| JP | 5-49058 | 2/2000 |

* cited by examiner

Primary Examiner—Hanh Nguyen
(74) Attorney, Agent, or Firm—Katten Muchin Zavis Rosenman

(57) ABSTRACT

In a multiprocessor exchange having a floating function, a signal distribution control processor is provided between a plurality of call control processors and a plurality of line controllers, and lines or highways are allocated to the call control processors on the basis of the line allocation information which is input from a terminal apparatus. The signal distribution control processor distributes the call control information on a predetermined line which is input from a line controller to the call control processor corresponding to the line by reference to the line allocation information, and distributes the call control information input from a call control processor to the corresponding line controller.

17 Claims, 25 Drawing Sheets

FIG.6

| HW NUMBER | CALL CONTROL PROCESSOR NUMBER |
|---|---|
| 1(LINES A/B) | 1 |
| 2(LINES C/D) | 1 |
| 3(LINE E) | 2 |
| 4(LINE F) | 3 |
| 5(LINES G/H) | 3 |

FIG.17A

| TRANSFER FLAG | HW NUMBER | CALL CONTROL PROCESSOR NUMBER |
|---|---|---|
| OFF | 1 | 1 |
| ON | 2 | 3 |
| OFF | 3 | 1 |

FIG.17B

| TRANSFER FLAG | HW NUMBER | CALL CONTROL PROCESSOR NUMBER |
|---|---|---|
| OFF | 1 | 1 |
| ON | 2 | 2 |
| OFF | 3 | 1 |

MULTIPROCESSOR EXCHANGE PROVIDED WITH FLOATING FUNCTION

BACKGROUND OF THE INVENTION

The present invention relates to a multiprocessor exchange provided with a floating function and, more particularly, to an exchange provided with a plurality of call control processors for executing a call processing on the basis of call control information, and further provided with a floating function, which is a function of executing a distributed call processing on a multiplicity of lines by allocating the lines to the respective call control processors logically through a maintenance procedure, that is, without changing the physical line connection.

In a conventional multiprocessor STM (Synchronous Transfer Mode) exchange which is not provided with a floating function, all of the lines (subscribers/trunks), the line control firmwares, the switches SW and the call control and signal control processors are physically connected.

FIG. 21 shows the structure of an example of such conventional multiprocessors having no floating function. In a conventional multiprocessors STM exchange, line information data 1a to 1c, for example, related to lines A to C, respectively, are held by a line control firmware LFM1 which accommodates the lines A to C, while call information data 2a to 2c related to the calls of the lines A to C, respectively, are held by a call control and signal control processor CSPR1 for controlling a switch SW1 which accommodates the lines A to C. Line information data 1d related to a line D is held by a line control firmware LFM2 which accommodates the line D, while call information data 2d related to the call of the line D is held by a call control and signal control processor CSPR2 for controlling a switch SW2 which accommodates the line D.

FIG. 22 is an explanatory view of the line information data 1a~1d which are held by a line state memory 3 of each of the line firmwares LMF1 and LMF2. The line state memory stores the following seven pieces of information (1) to (7) on each line:

(1) task execution display for displaying whether or not the task of the call which has used the line is being executed;
(2) a state number for indicating the state (state for receiving a dial number, ringing state, talking state, etc.) of the line control firmware;
(3) a link data number which is a control number of a memory related to a line controlled by the firmware;
(4) flush monitor information for indicating whether or not the hook flushing of the subscriber is allowed;
(5) a line type for indicating the type (general subscriber, public telephone, party line telephone, etc.) of the line;
(6) a call type for discriminating between a general call and a test call; and
(7) relief information for indicating whether or not the line is to be relieved at the time of restart/trouble.

FIG. 23 is an explanatory view of the call information data 2a~2d and the line related data 2a~2d' which are held by a call state memory 4 and a line related memory 5 of each of the call control and signal control processors CSPR1 and CSPR2. The call state memory 4 stores the following 9 pieces of information:

(1) control information for indicating whether or not the memory is being used;
(2) call state number given according to a calling stage (dialling, ringing, talking, etc.);
(3) control number for checking the call using the memory;
(4) line information which is general information on the line such as a subscriber and a trunk and which includes a subscriber number (phone number) and accommodated position information for indicating the position of a subscriber and a trunk in the exchange;
(5) translated information obtained by translating a given numeral (call type such as local call and international call, receivable number of figures, accounting information, etc.);
(6) numeral information received with respect to the call;
(7) time information on the exchange processing such as call time, response time, and call end time;
(8) timer information on the types of the timers started for processing the call (timer for measuring period of the ringing, timer for measuring period between the figures when receiving numbers, etc.) and
(9) traffic information on the call.

The line related memory 5 stores the following 4 pieces of information.:

(1) control information for indicating whether or not the memory is being used;
(2) line state number for indicating the state (vacant, used, troubled, etc) of the line;
(3) line information for indicating the position of the path in the exchange used by the line; and
(4) control number for checking the call using the memory.

(a) Restart Processing with Relief in a Conventional Multiprocessor Exchange In the above-described multiprocessor exchange, when there is a call in a stable communication state (stable call) between lines which are controlled by different processors and firmwares like a call between the line A and the line D, the "restart processing with relief" executed by the processor CSPR1, which executes a call control and a signal control for the line A, will be described.

The stable call is a call in the course of talking or ringing. In general, the stable call is a call which does not incur contradiction in the data held by the call control processor and the line control firmware, even if the call processing is stopped and communication is continued or which can correct the contradiction if any. The "restart processing with relief" is a processing executed by a relief/restart program when, for example, abnormality in a program or apparatus, access of illegal data, etc. are detected in a monitoring program. The restart processing is classified into 3 levels from a first to third levels. The "restart processing with relief" is executed at a first level.

First level: only the processing in the course of execution is initialized and the call in a stable state is not initialized. When success is not obtained even after four cycles of restart processings at a first level, a restart processing at a second level is executed.

Second level: all the resources including hardwares are initialized, and a stable call is also initialized. When success is not obtained even after four cycles of restart processings at a second level, a restart processing at a third level is executed.

Third level: the file is reloaded from the main memory backup region of a hard disk HDU so as to initialize all the resources including hardwares.

When the processor CSPR1 is to execute a "restart processing with relief", the processor instructs the line control firmware LFM1 which accommodates the line A to stop the call control. The call control and signal control processor CSPR1 then executes a match processing on the internal data (call control information 2a of the line A), and after the end of the match processing, the processor sends relief information to the line control firmware LFM1 and requires a match processing. The call control and signal control processor CSPR1 executes a match processing again on the basis of the result of the match processing received from the firmware LFM1, and after the end of the match processing, it instructs the line control firmware LFM1 to start a call processing.

The general matching procedure is as follows.

(a) A processor (for example, the call control and signal control processor CSPR1) starts a "restart processing with relief".

(b) The processor requires all the subordinate firmwares (e.g., the line control firmware LFM1) to stop the call control. The firmware then stops the call control processing of all the subordinate lines. However, the call control information such as on-hook information, off-hook information sent from the lines is held.

(c) The processor executes the release (initialization) of the temporary data for call control which are in the process of production, on the calls except the stable call (d) The processor informs all the subordinate firmwares of the relief imformation on the stable call which has been judged to be relieved.

(e) Each of the firmwares compares the line states of all the lines under its own control with the relief information received from the host processor, and releases or initializes the call related data on the lines which are not included in the relief information (initialization). Even if a line is included in the relief information (the processor recognizes the line as an object of relief, if a firmware judges the line is not an object of relief, the firmware informs the host processor of the line in non-relief information. For example, when the stable call in the course of talking is ended in the process of "restart processing with relief", the firmware judges the stable call not to be an object of relief and informs the host processor of the line which is not an object of relief in non-relief information.

(f) The processor receives the non-relief information from each firmware, and releases the related temporary data for call control.

(g) When the match processing in the exchange is finished, the processor requires each firmware to start a call control, and each firmware starts a call processing.

(h) In the case of a digital subscriber (BRI/PRI: Basic Rate Interface/Primary Rate Interface), since a subscriber has a call state, a message (Status-enq) in accordance with the advice is sent to the subscriber so as to execute the match processing for each subscriber.

The matching procedure of the "restart processing with relief" executed by a-firmware is the same as the above-described procedure except for the way of start.

Although the above-described match processing is executed between the call control processor CSRP1 and the line control firmware LFM1, match processing is not executed between the line control firmware LFM2 which accommodates the line D and the the call control and signal control processor CSRP2. But when the match processing is finished between the call control processor CSRP1 which holds the information on the line A and the line control firmware LFM1, the stable call between the line A and the line D is relieved by the communication between the processors CSRP1 and CSRP2.

As described above, in a conventional multiprocessor exchange having no floating function, it is possible to relieve a stable call at the time of execution of the "restart processing with relief" so long as the processors and the firmwares are physically connected even if a call is controlled by different processors and firmwares like a call between the lines A and the line D. More specifically, since all types of information on call control is held by processors and firmwares which are physically connected, it is possible to relieve state of a stable call by executing a match processing between these processors and firmwares which are physically connected at the time of executing the "restart processing with relief".

(b) Shift

In the conventional multiprocessor exchange having no floating function shown in FIG. 21, there is a case in which it is favorable to shift a predetermined line, for example, the line C to another processor, for example, the call control and signal control processor CSRP2 or a new processor to lighten the load of the call control and signal control processor CSRP1. In such a shift, the physical connection of the line C is changed after the call on the line C is finished or the call is forcibly released in a maintenance procedure, and the line data (the type of the line, phone number information, service information, etc.) on the line C are eliminated from the call control processor CSPR1 and set again in the new call control processor CSPR2 to which the line C is shifted, in the maintenance procedure.

FIGS. 24 and 25 are explanatory views of examples of call connection and a shift of a line, respectively, in a multiprocessor exchange having no floating function. The same reference numerals are provided for the elements which are the same as those shown in FIG. 21. Line controllers LCT1 and LCT2 are provided with line control hardwares SHF1 and SHF2, respectively, and line control firmwares LFM1 and LFM2, respectively. The line control hardwares SHF1 and SHF2 execute time-division multiplex on the transmission signals sent from a plurality of lines and input the time-division multiplex signals into switches SW1 and SW2, respectively, through the highways HW1 and HW2, respectively, and separate the time-division multiplex signals input from the switches SW1 and SW2, respectively, through the highways HW1 and HW2, and sent the separated signals to the lines..

1) The line A is accommodated in the highway HW1, and the call control and signal control processor CSRP1 manages the line data. The line B is accommodated in the highway HW2, and the call control and signal control processor CSRP2 manages the line data (see FIG. 24).

2) The call control information between the line A and the call control and signal control processor CSRP1 is transmitted and received through the line A, the line control firmware LFM1 and the call control processor CSPR1, or by the reverse route. The call control information between the line B and the call control and signal control processor CSRP2 is transmitted and received through the line B, the line control firmware LFM2 and the call control processor CSPR2, or by the reverse route. The processors CSRP1 and CSRP2 transmit and receive call control information therebetween at the time of communication between the processors. Signals such as sound and voice are transferred from the line A to the line B through the line control hardware SHF1, the switch SW1, the switch SW2, and the line control hardware SHF2, or by the reverse route.

(3) If the call control and signal control processor CSRP2 assumes a high load state in the above-described state, a call control processor CSRP3 (FIG. 25) is grown to shift the control of the highway HW2 accommodated in the call control processor CSRP2 to the new call control processor CSRP3, thereby dispersing the load.

(4) Since the call control and signal control processors CSPR1 and CSPR2 do not have a floating function and the highways HW1 and HW2 are fixedly accommodated in the respective call control and signal control processors, it is necessary to temporarily stop the communication between the lines A and B in order to shift the control of the highway HW2.

5) After the call on the line B is finished, the line data on the line B and the highway HW2 are shifted to the call control and signal control processor CSPR3, and the connection of the line B is also physically changed to the call control and signal control processor CSPR3.

A similar control is executed and it is necessary to temporarily stop the communication of the subscriber in the course of talking in the case of shifting a line to the existing call control processor CSRP without growing a new processor. It is also necessary to temporarily stop the talking of the subscriber at the time of the degrowth of a call control and signal control processor.

(C) Generic Update

In an exchange in use, the system sometimes changes to a new system using a new file such as a new exchange program which includes addition of a new function, modification of a function and so on. This change will be called generic update hereinunder. In such generic update, it is necessary to transfer the data in the old system to the new system. In a conventional exchange, the data in the old system are transferred into data in the new system after they are subjected to conversion/modification. In addition, priority is given to the generic update time, so that the acceptance of a request for conversion or change of each data in the old system is temporarily limited, and all the data are collectively transferred to the new system. Furthermore, data such as a call state which is frequently changed are also collectively transferred to the new system. In this manner, since the states of the old system transferred to the new system are only the states at the start point of time of data transfer and comparative long time is required until the end of transfer, the actual current states of the old system do not agree with the states of the new system after the end of transfer due to time difference. For this reason, the call is forcibly released and initialized after the end of transfer, and even the call is a stable call such as a call in the course of talking or ringing, it is not relieved.

FIG. 26 is an explanatory view of generic update in a multiprocessor exchange having no floating function. The same reference numerals are provided for the elements which are the same as those shown in FIG. 21. The subscriber (line) A is accommodated in the switch SW1 and controlled by the call control and signal control processors CSPR1, while the subscriber (line) B is accommodated in the switch SW2 and controlled by the call control and signal control processors CSPR2. If generic update (hereinunder referred to GU) is executed in this state, the line related data 1$a$, 1$b$ managed by the respective line control firmwares LMF1, LMF2 and the call state data of the subscribers 2$a$, 2$b$ managed by the respective call control processors CSPR1, CSPR2 are initialized, thereby the data before GU are changed into the data after GU.

(a) First Problem

It is possible to disperse the load of a call control processor in a multiprocessor exchange having no floating function. However, it is necessary to physically switch the connection of lines in order to change the load of each call control processor after the construction of a system, which work is disadvantageously troublesome.

(b) Second Problem

The present inventor proposes a multiprocessor exchange provided with a floating function in order to solve the first problem. However, a multiprocessor exchange provided with a floating function cannot relieve a stable call in the same manner as in the "restart processing with relief" executed by a conventional exchange having no floating function. More specifically, in the conventional multiprocessor STM exchange, when there generates an event which requires a processing including matching and relief (for example, "restart processing with relief"), it is possible to relieve a stable call only by executing a simple match processing on the call control information which is fixedly placed within the extent of physical connection. In contrast, in a mutiprocessor exchange provided with a floating function, it is impossible to relieve a stable call by adopting the conventional method. This means a new method for relieving a stable call in the multiprocessor exchange provided with a floating function.

The new type of multiprocessor exchange proposed above is provided not only with a plurality of call control processors but also with a signal distribution control processor between a line controller and each of the call control processors, and a terminal apparatus inputs line allocation information for allocating a line to each call control processor. The signal distribution control processor distributes the call control information which is input from a line controller to the call control processor corresponding to the line, and distributes the call control information input from a call control processor to the corresponding line controller by reference to the line allocation information. According to such a new type of multiprocessor, (1) it is possible to disperse the load of a processor by sharing the function of call control, signal distribution control, maintenance, etc. with each other. (2) It is possible to allocate lines or highways to the corresponding call control processors by inputting the line allocation information from the terminal apparatus, which enables the dispersion of the load of a processor without the need for changing the physical line connection. In addition, (3) it is possible to provide the exchange with a floating function of a processor.

A new type of multiprocessor exchange, however, is different from a conventional multiprocessor exchange in that when there generates an event which requires a processing including matching and relief (for example, a "restart processing with relief"), it is necessary to execute match and relief processing by taking the difference in function allocated to each processor and the positions of temporary data produced when a call is actually set into the consideration. This is especially the case with an exchange which has introduced an object oriented software structure, and further with an exchange adopting a pack communication system aimed at a reduction in the amount of communication between the processors. The pack communication system is a periodical communication system for collectively communicating data which have been required to communicate between processors, for example, every 16 ms. As described above, when a processor or a firmware of a new type of STM exchange needs to execute a "restart processing with relief", the match processing aimed at the relief of a stable call such as a call in the course of talking or ringing is necessary. It is also necessary to stop a call processing of only the line or the highway related to the processor on which the "restart processing with relief" is executed, and not to stop a call processing of the lines or the highways related to the other processors or firmwares.

(c) Third Problem

In an exchange in use, a line or a highway is sometimes shifted to a grown processor or another processor with a less load in order to disperse the load of a call processing. In a conventional exchange, lines or highways are fixed to call control processors. For this reason, it is necessary to change the physical connection of the line or the highway as the object at the time of shift, and since the lines or the highway cannot be used during this period, it is also necessary to release the stable call on the line. Accordingly, in a conventional multiprocessor exchange, it is disadvantageously impossible to relieve a stable call during shift.

(d) Fourth Problem

Since the state of a new system after the end of transfer of the data does not agree with the actual state in a conventional generic update, the call is forcibly released and initialized immediately after the leadership of the control is swiched from the old system to the new system, and a stable call such as a call in the course of talking or ringing is not relieved. In the generic update proposed in the present invention, the old system transfers the data to a new system without stopping the use, and the new system receives the old data and starts to convert or modify the old data into new data. Even after the transfer of the old data from the old system to the new system and the conversion or modification of the old data, the old system continues to transfer the difference between the remaining old data and the data transferred to the new system. Accordingly, it is possible to transfer the latest state of the data in the old system to the new system. In this case, there is a possibility of relieving a stable call, and it is required to relieve the stable call immediately after the leadership of the control is switched from the old system to the new system.

SUMMARY OF THE INVENTION

Accordingly, it is an object of the present invention to eliminate the above-described problems in the related art and to provide a multiprocessor exchange which is able to change the load of each call control processor easily only by changing the logical line allocation information which specifies the line to be allocated to each call control processor without the need for changing the physical line connection.

It is another object of the present invention to provide a multiprocessor exchange which is able to specify lines to be allocated to each call control processor individually per line basis or collectively per highway basis, and to stop or start a call processing on a line or a highway irrespective of the other lines or highways.

It is still another object of the present invention to provide a multiprocessor exchange which enables match processing aimed at the relief of a stable call such as a call in the course of talking or ringing when one of a call control processor, a signal distribution control processor and a firmware which constitute the multiprocessor exchange having a floating function executes restart processing.

It is a further object of the present invention to provide a multiprocessor exchange provided with a floating function which is able to relieve a stable call when a line or a highway is shifted.

It is a still further object of the present invention to provide a multiprocessor exchange provided with a floating function which is able to relieve a stable call at the time of a restart processing after systems are switched for a generic update.

To achieve these objects, the present invention provides multiprocessor exchanges provided with the following functions (a) to (d).

(a) Mutiprocessor Exchange Provided with a Floating Function

A multiprocessor exchange having a floating function according to the present invention comprises a plurality of call control processors and a signal distribution control processor provided between a line controller and each of the call control processors, and a terminal apparatus inputs line allocation information so as to allocate a line to each of the call control processors. The signal distribution control processor distributes the call control information on a predetermined line which is input from the line controller to the call control processor corresponding to the line by reference to the line allocation information, and distributes the call control information input from the call control processor to the corresponding line controller. In this manner, it is possible to change the load of each call control processor easily only by changing the line allocation information for allocating a line to each call control processor without the need for changing the physical line connection.

In the multiprocessor exchange according to the present invention, a terminal, apparatus as a line allocating means is able to allocate lines to each control processor individually per line basis or collectively per highway basis.

In the multiprocessor exchange according to the present invention, the call control processor can also serve as a signal distribution control processor.

In the multiprocessor exchange according to the present invention, when a plurality of line controllers are provided, the signal distribution control processor is able to distribute the call control information which is to be input from a call control processor to a predetermined line to the line controller to which the line is connected.

In the multiprocessor exchange according to the present invention, when a plurality of signal distribution control processors are provided, a call control processor is able to input the call control information on a predetermined line to the line controller to which the line is connected through a predetermined signal distribution control processor.

According to the multiprocessor exchange of the present invention, it is possible to change a call control processor which executes the call processing on a line without the need for changing the physical line connection, by changing the line allocation of the terminal apparatus. This change of a call control processcor is referred to as "shift".

(b) Match Processing Function in the "Restart Processing with Relief"

The call control processor of the multiprocessor exchange according to the present invention is able to relieve a stable call such as a call in the course of talking or ringing by executing a match processing in the "restart processing with relief". Similarly, the signal distribution control processor and the line firmware are able to relieve a stable call by executing a match processing in the "restart processing with relief".

In the match processing in the "restart processing with relief", (1) the call control processor requires the line controller to which the line allocated thereto is connected to stop the call control by designating the lines, (2) the line control firmware of the line controller stops the call control of the designated line, (3) the call control processor then (3-1) starts a match processing aimed at the relief of the stable call on the line allocated thereto, releases the call related data of the line which corresponds to a call other than a stable call (such a call will be referred to "nonstable call" herein after) in the match processing, and (3-2) produces relief information for relieving the stable call and sends the information to the line control firmware, (4) the line control firmware (4-1) releases the call related data on the lines which are not designated in the relief information, (4-2) and produces non-relief information on the lines which the line control firmware does not judge as the object of relief even if they are designated in the relief information, and sends the nonrecovery information to the call control processor, (5) the call control processor releases the call related data on the lines designated in the non-relief information, and when the match processing is finished, the call control processor requires the line control firmware to start the call control on the line which has been stopped, and (6) the line control firmware starts to the call control on the designated line. In the match processing, the call control processor requires the line control firmware to stop or start the call control of the lines individually per line basis or collectively highway basis.

In this manner, the call processing of only the line or highway which is related to the call control processor which is executing the "restart processing with relief" is stopped, and the call processing of the lines or highways related to the others are not stopped. It is therefore possible to limit the number of lines which cannot be used in the match processing at the time of "restart processing with relief" to the minimum, and further to shorten the matching time and therefore the time during which the line cannot be used, thereby enhancing the reliability of the system.

(c) Match Processing Function at the Time of Shift

In the multiprocessor exchange having a floating function according to the present invention, when the line allocated to the first call control processor in the course of call processing is shifted to a second call control processor, the call control information on the line held by the first call control processor is transferred to the second call control processor, thereafter the second call control processor executes a match processing in order to relieve the stable call, and then the second call control processor starts a call control.

In the match processing, the second call control processor (1) starts a match processing aimed at the relief of the stable call on the line which is allocated to the second call control processor, releases the line related data on the lines which correspond to nonstable calls in the match processing, produces relief information for relieving a stable call and sends the information to the line control firmware, (2) the line control firmware (2-1) releases the call related data on the lines which are not designated in the relief information, and (2) produces non-relief information on the lines which the line control firmware does not judge as the object of relief even if they are designated in the relief information, and sends the non-relief information to the call control processor, and (3) the second call control processor releases the call related data on the lines designated in the non-relief information and starts a call control. In the match processing, the call control processor requires the line control firmware to stop or start the call control of lines individually per line basis or collectively per highway basis. In this manner, the second call control processor is able to relieve the stable call in the match processing after the shift, and the call processing only on the lines or highways which are allocated to the second call control processor is stopped, while the call processing on the lines or highways which are allocated to another call control processor is not stopped.

(d) Match Processing Function After the Generic Update

The old file held by each of a active call control processor and standby call control processor is updated into a new file, and the control is switched over from the active call control processor to the standby call processor as a new call control processor. The new call control processor starts "restart processing due to the generic update". The new call control processor relieves the stable call such as a call in the course of talking or calling by executing a match processing in a similar manner as in (b).

Other features and advantages of the present invention will be apparent from the following description taken in conjunction with the accompanying drawings.

BRIEF DESCRIPTION OF THE DRAWINGS

FIG. 6 shows a highway number-call control processor number allocation table;

FIGS. 17A and 17B show highway number-call control processor conversion tables;

DESCRIPTION OF THE PREFERRED EMBODIMENTS

(a) Schematic Structure of the Present Invention

Figure 1:
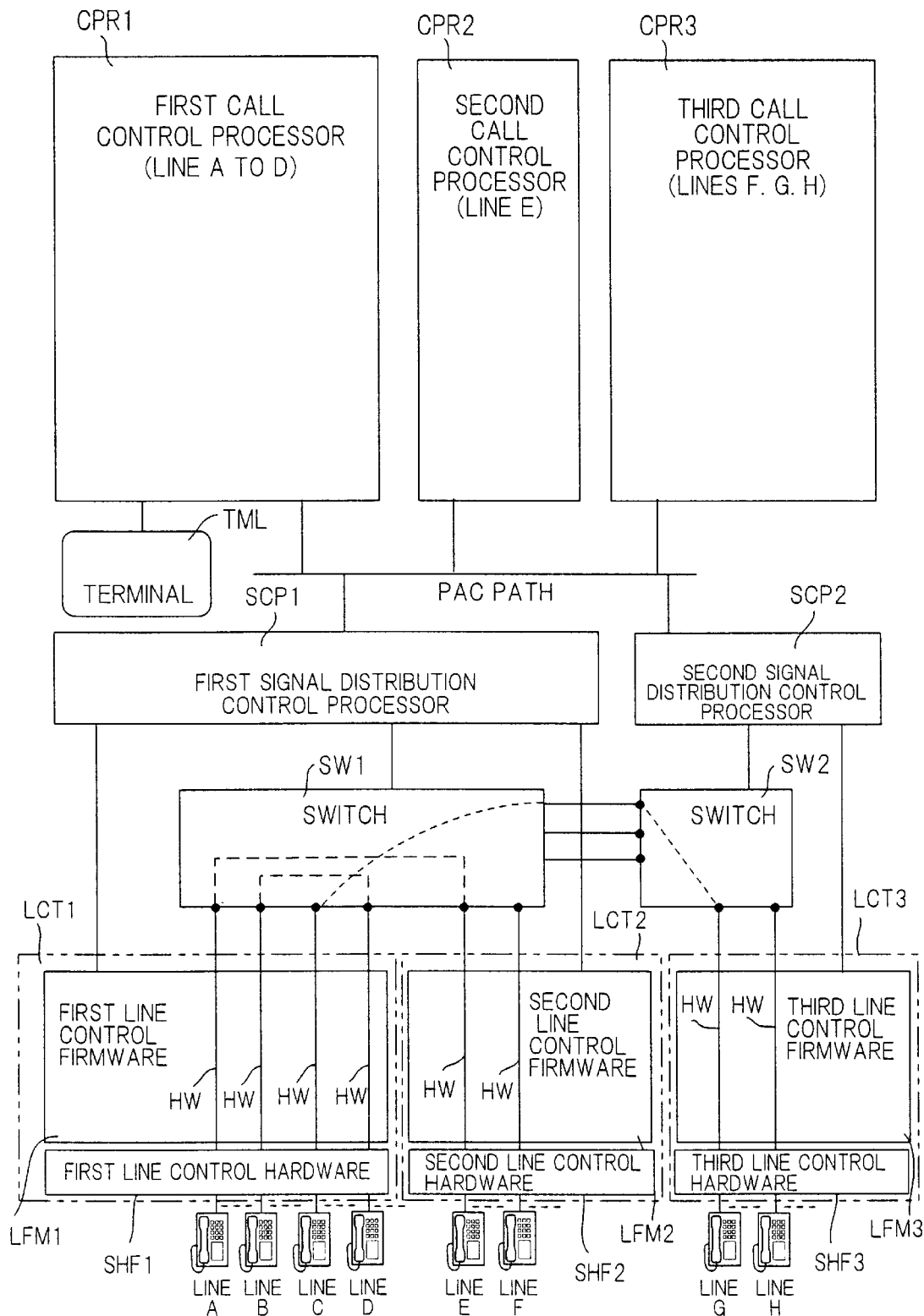
FIG. 1 schematically shows the structure of a multiprocessor exchange having a floating function.

FIG. 1 schematically shows the structure of a multiprocessor exchange having a floating function according to the present invention. The multiprocessor exchange is provided with a plurality of call control processors CPR1 to CPR3, switches SW1 and SW2, line controllers LCT1 to LCT3, a line allocating means (terminal apparatus) TML, and signal distribution control processors SCP1 and SCP2.

Each of the call control processors CPR1 to CPR3 executes a call processing on the basis of call control information, and each of the switches SW1 and SW2 sends a transmission signal such as a sound signal which is input through a predetermined line to another line by the control of the call control processor. Each of the line controllers LCT1 to LCT3 executes a call control such as the transmission and reception of call control information between a line and a call control processor and the management of line related data, and further inputs a transmission signal input from a line to a switch, while sending a transmission signal from a switch to a line. The line controllers LCT1 to LCT3 are provided with line control hardwares SHF1 to SHF3, respectively, and line control firmwares LFM1 to LFM3, respectively. The line control hardwares SHF1 to SHF3 execute time-division multiplexing on the transmission signals (digital data) sent from a plurality of lines and input the time-division multiplex signals into the switches SW1 and SW2 through the highways HW, and separate the time-division multiplex signals input from the switches SW1 and SW2 through the highways HW, and send the separated signals to the lines. The line control firmwares LFM1 to LFM3 transmit and receive call control information between the lines and the call control processors, and execute a call control such as the management of call related data on the lines.

The terminal apparatus TML as the line allocating means logically allocates a highway individually (provided that if the line is not a multiplex line, the line itself is allocated) to each call control processor. The signal distribution control processors SCP1 and SCP2 are provided between the line controllers LCT1 to LCT3 and the call control processors CPR1 to CPR3, distribute the call control information input from the line controllers LCT1 to LCT3 to the respective call control processors CPR1 to CPR3 by reference to the line allocation information which is set by the terminal apparatus TML, and distribute the call control information input from the respective call control processors CPR1 to CPR3 to the corresponding line controllers. The signal distribution control processors SCP1 and SCP2 also control the switches SW1 and SW2, respectively, on the basis of the instruction from the respective call control processors.

In brief, a multiprocessor exchange according to the present invention is provided with a plurality of call control processors CPR1 to CPR3, and the signal distribution control processors SCP1 and SCP2 which are provided between the line controllers LCT1 to LCT3 and the call control processors CPR1 to CPR3 and the terminal apparatus TML inputs the line allocation information by which a line or highway is logically allocated to the corresponding call control processor. The signal distribution control processors SCP1 and SCP2 distribute the call control information on predetermined lines which is input from the firmwares LFM1 to LFM3 of the line controllers LCT1 to LCT3 to the call control processors CPR1 to CPR3 corresponding to the lines by reference to the line allocation information which is set by the terminal apparatus TML. Furthermore, the signal distribution control processors SCP1 and SCP2 distribute the call control information on predetermined lines input from the respective call control processors CPR1 to CPR3 to the firmwares LFM1 to LFM3 of the line controllers LCT1 to LCT3 to which said predetermined lines are connected.

Owing to the above-described structure, according to the multiprocessor exchange of the present invention, no physical change of the line connection is required, and it is possible to easily change the load of each call control processor only by changing the line allocation information for specifying a line to be allocated to each call control processor. Furthermore, it is possible to allocate a predetermined line or highway individually to each call control processor. In addition, it is possible to make one of the call control processors serve also as a signal distribution control processor.

(b) Relief of a Stable Call by Match Processing

In a multiprocessor exchange having a floating function according to the present invention, a stable call is relieved by executing a match processing in "restart processing with relief". This restart processing is executed in the following way.

The call control processor CPR1, for example, requires the line controller LCT1 to which the lines A to D allocated thereto are connected to stop the call control on the lines A to D in restart processing. The call control processor CPR1 then (1) starts a match processing aimed at the relief of the stable calls on the lines A to D which are allocated to the call control processor CPR1, releases the call related data on the line which corresponds to a nonstable call in the match processing, and (2) produces relief information for relieving a stable call and sends the information to the line control firmware LFM1.

The line control firmware LFM1 (1) releases the call related data on the lines which are not designated in the relief information, (2) produces non-relief information on the lines which the line control firmware does not judge as the object of relief even if they are designated in the relief information, and sends the non-relief information to the call control processor CPR1. The call control processor CPR1 releases the call related data on the lines designated in the non-relief information, and when the match processing is finished, the call control processor CPR1 requires the line controller LCT1 to start the call control on the lines which has been stopped, and the line control firmware LFM1 starts the call control on the designated lines.

In this case, when the line controller LCT1 executes time-division multiplexing on the signals input from a plurality of lines, inputs the time-division multiplex signals to the switch SW1 through a highway HW, and separates the time-division multiplex signal input from the highway HW and sends the separated signal to the lines, the call control processor CPR1 is able to require the line control firmware LFM1 to stop or start the call control of the lines collectively per highway basis.

In the "restart processing with relief" of a signal distribution control processor or a line control firmware, it is possible to relieve a stable call by executing a match processing similar to the above-described one.

It is also possible to relieve a stable call by executing a match processing similar to the above-described one at the time of shift or generic update.

(B) Multiprocessor Exchange According to the Present Invention (a) Structure

Figure 2:
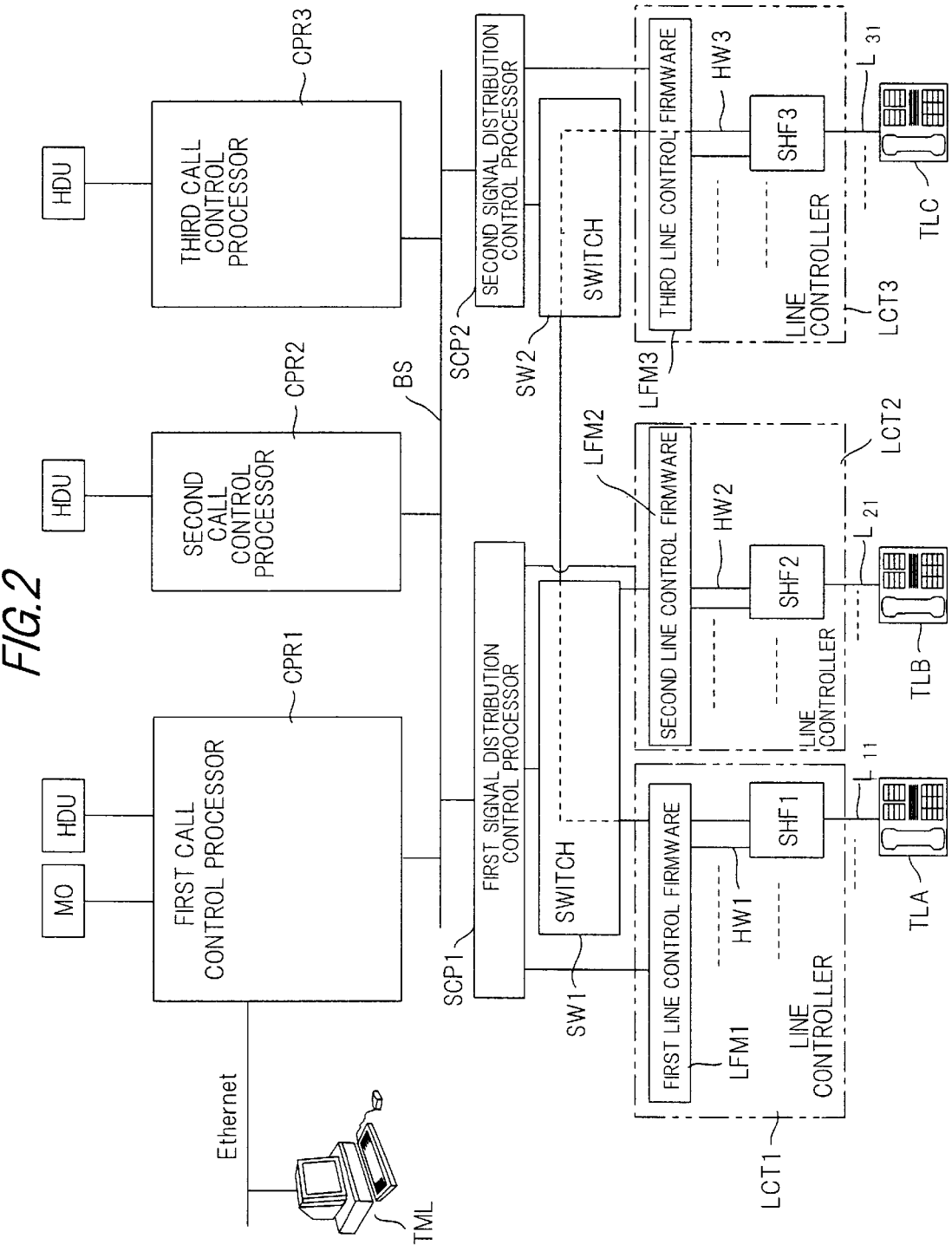
FIG. 2 shows the structure of a multiprocessor exchange having a floating function according to the present invention.

FIG. 2 shows the structure of a multiprocessor exchange having a floating function according to the present invention. The same reference numerals are provided for the elements which are the same as those shown in FIG. 1.

The floating function is a function of dispersing a load or executing the growth, degrowth, or shift of a processor only by a maintenance procedure without the need for changing the physical line connection. The multiprocessor exchange of the present invention provided with such a floating function is provided with a plurality of call control processors CPR1 to CPR3, the switches SW1 and SW2, the line controllers LCT1 to LCT3, the terminal apparatus TML as a line allocating means and the signal distribution control processors SCP1 and SCP2, and each processor transmits and receives data by PAC communication via a data bus BS.

The terminal apparatus TML is connected to the first call control processor CPR1 through Ethernet in such a manner as to be able to transmit and receive data therebetween. A maintenance man manages the terminal apparatus TML so as to (1) logically allocate (inputs logical allocation information) the lines or highways to the call control processor, or changes the allocation, (2) input a command for executing shift, and further (3) input various kinds of commands at the time of generic update. The terminal apparatus TML logically allocates lines collectively per highway basis to the corresponding call control processor, but it is possible to allocate the line itself if the signal transmitted from the line is not multiplexed.

An optical magnetic disk apparatus MO and hard disks HDU are connected to the call control processors CPR1 to CPR3 so that a new file such as a new exchange program is input from the optical magnetic disk apparatus of the first call control processor CPR1. The first call control processor CPR1 transfers a new file input from the optical magnetic disk apparatus MO to each call control processor, which stores the new file into the corresponding hard disc HDU. The first call control processor CPR1 also distributes the line allocation information which is input from the terminal apparatus TML to the line control firmwares LFM1~LFM3.

Each of the call control processors CPR1 to CPR3 executes a call processing on the line or highway allocated thereto on the basis of the call control information which is received from the corresponding line control firmwares LCT1 to LCT3, and also executes a match processing for relieving a stable call in the "restart processing with relief". Each of the switches SW1 and SW2 transmits a transmission signal such as a sound signal which is input through a predetermined line to another line by the control of the call control processors CPR1 to CPR3.

Each of the line controllers LCT1 to LCT3 transmits and receives call control information between the line (subscriber lines, trunks) and the call control processor, manages line related data, and further inputs the transmission signal from a line $Lij(i=1,2\ldots,j=1,2\ldots)$ to the switch, while transmitting the transmission signal from the switch to the line Lij. The line controllers LCT1 to LCT3 are provided with the line control hardwares SFH1 to SFH3, respectively, and the line control firmwares LFM1 to LFM3, respectively. The line control hardwares SHF1 to SHF3 execute time-division multiplexing on the transmission signals sent from a plurality of lines Lij and input the time-division multiplex signals into the switches SW1 and SW2 through the highways HW1 and HW2, HW3, . . . , and separate the time-division multiplex signals input from the switches SW1 and SW2 through the highways HW1, HW2, HW3, . . . , and send the separated signals to the lines Lij. The line control firmwares LFM1 to LFM3 transmit and receive call control information between the lines and call control processors and also control call related data.

Figure 3:
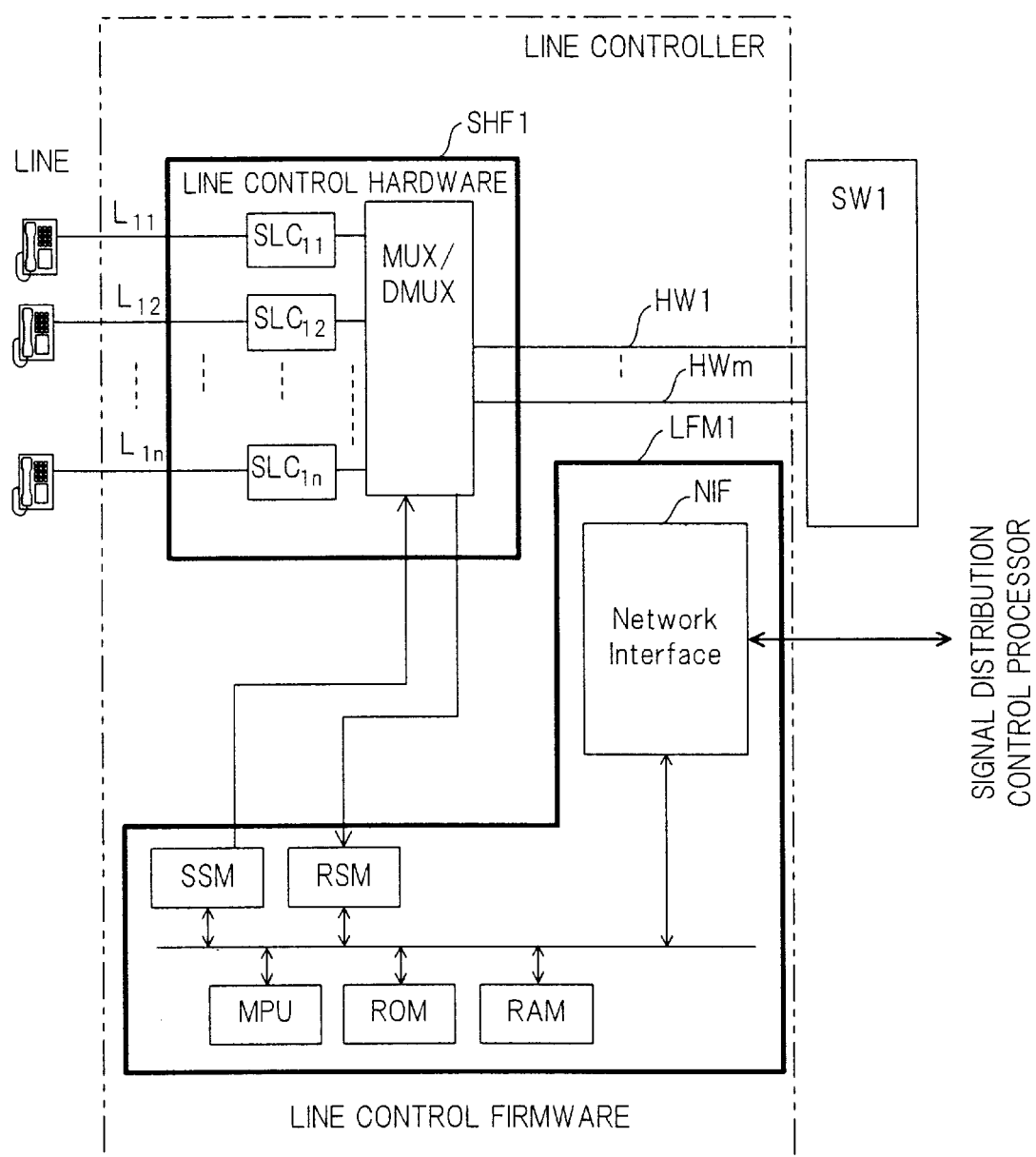
FIG. 3 shows the structure of a line controller.

FIG. 3 shows the structure of the line controller LCT1. The line control hardware SFH1 is provided with subscriber trunk circuits SLij which are connected to the lines (subscriber line or trunk) Lij and a multiplexer/demultiplexer MUX/DMUX for multiplexing/demultiplexing a transmission signal. The multiplexer/demultiplexer MUX/DMUX executes time-division multiplexing on the signals which are input from the lines Lij through the subscriber trunk circuits SLij and sends the time-division multiplex signals to the highways HW1 to HWm, and separates the time-division multiplex signals input from the highways HW1 to HWm and sends the separated signals to the lines Lij through the subscriber trunk circuits SLij.

The line control firmware LFM1 is provided with a microprocessor MPU, a ROM and a RAM so as to transmit and receive the call control information between the lines and the call control processor and to execute management of call related data on the lines in accordance with the program stored in the ROM. The line control firmware LFM1 is further provided with a signal reception memory RSM, a signal transmission memory SSM, and a network interface NIF.

The signal reception memory RSM stores signaling information which is call control information including on-hook data, off-hook data and dial number, etc. on each highway which is reported from the corresponding line to the firmware in the form of ON/OFF of the corresponding bit, and the signal transmission memory SSM stores signalling information which is call control information including start command of ringing, on/off command of CODEC and caller's phone number, etc. in the form of ON/OFF of the corresponding bit.

Returning to FIG. 2, the signal distribution control processors SCP1 and SCP2 are provided between the line controllers LCT1 to LCT3 and the call control processors CPR1 to CPR3 distribute the call control information of a predetermined line which is input from one of the line controllers LCT1 to LCT3 to the call control processors CPR1 to CPR3 corresponding to the line by reference to the line allocation information which is set by the terminal TML, and further distribute the call control information on a predetermined line which is input from the call control processors CPR1 to CPR3 to the line controller to which the predetermined line is connected. The signal distribution control processors SCP1 and SCP2 also control the switches SW1 and SW2, respectively so as to switch a transmission signal to a predetermined line.

In this manner, according to the multiprocessor exchange of the present invention, it is possible to change the distribution of the load of each call control processor only by changing the line allocation information for specifying the lines which are allocated to the call control processors CPR 1 to CPR3 without the need for changing the physical line connection.

(B) Table Held by a Call Control Processor

Figure 4A:
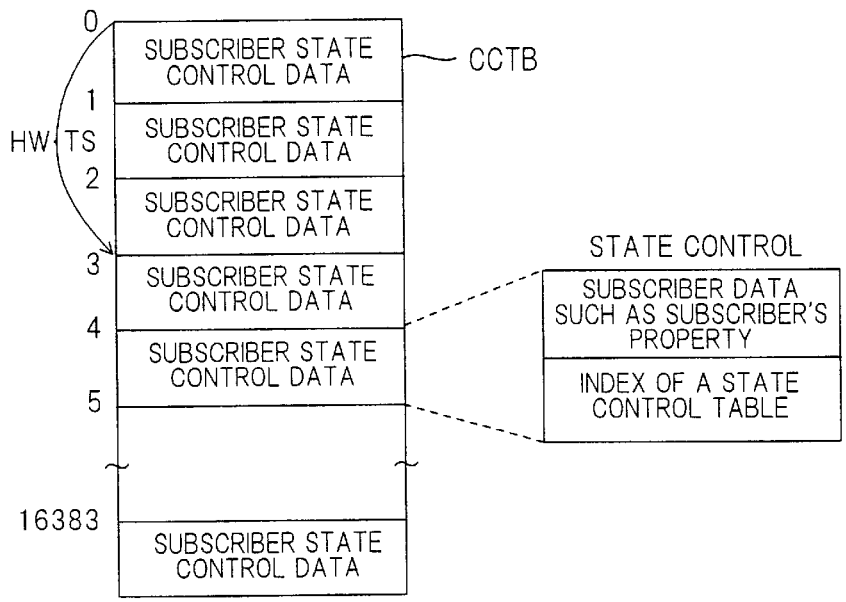
FIGS. 4A and 4B are explanatory views of the tables held by a call control processor.
Figure 4B:
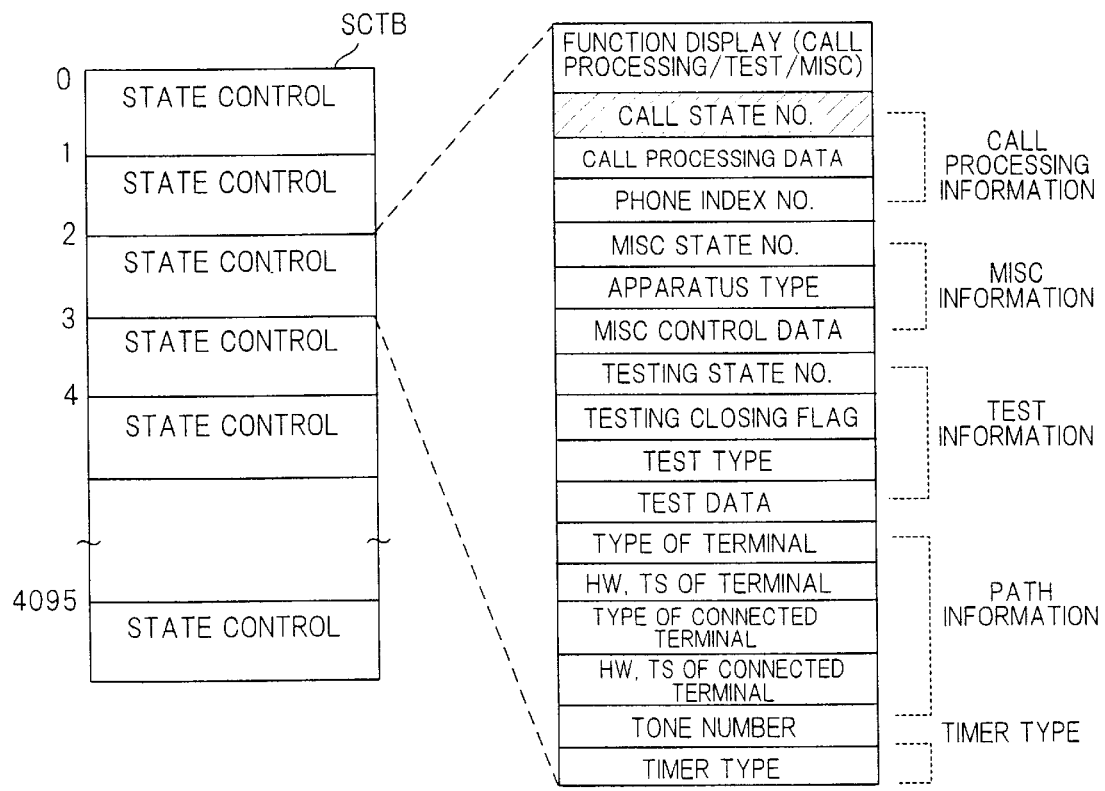

FIGS. 4A and 4B are explanatory views of the call processing control table CCTB and the state control table SCTB, respectively, held by a call control processor.

The call processing control table CCTB is a table for controlling the states of HW×TS number of subscribers on the assumption that the maximum number of highways which the call control processor is in charge of is HW, and the number of multiplex channels (time slots) in one highway is TS. Each state control data of the HW×TS number of subscribers is provided with (1) subscriber data such as subscriber's property, and (2) the index (pointer) of the state control table SCTB.

The state control table SCTB contains the same number of items of state control data as the maximum connection paths (=4096) and controls for each path (1) call processing information, Misc information, or test information, (2) path information, and (3) timer type information for displaying in which task the timer is being used.

The "call state NO." in the table SCTB means the state of a call in the flow of the call (vacant→reception of a number→ringing→talking→end), and a number is assigned to each of the states. The relationship between a number and a state is as follows:

01: vacant
02: preparing for the reception of a number
03: receiving a number
03–5: received numbers (storing)
04: ringing (caller)
14: ringing (receiver)
05: talking (caller)
15: talking (receiver)
06: waiting for the release at the end of call (caller)
16: waiting for the release at the end of call (receiver)
07: waiting for the release by disconnection
08: lockout
100: blocked The "call processing data" in the table SCTB is a general term of the data collected in the transition of a call (in the process of a call), and includes the following:
calling/receiving subscriber data
ringing/answering/end of call time
dial number/sending number
account data The "phone number index" indicates the index NO. of the phone number control table for storing the information on the received phone numbers.

The Misc (miscellaneous) is a general term of the miscellaneous trunks in all types of trunks. Typical Misc includes TKT (trunk for a message), TWT (trunk for talking among three), VDTIT (trunk for starting/ending a call), and DANM (trunk for digital announcement). The TKT requires a Misc controller to connect or release of a trunk for a message under instruction from a HOST so as to send a message to a subscriber, the TWT (trunk for talking among three) realizes the talking among three at the same time, and the VDTIT (trunk for starting/ending a call) realizes a function of displaying the number of a caller to a receiver.

The "terminal type" in the path information is an identifier for identifying the transmission of an order from a software to a hardware or the reception of an order from a hardware to a software, and the "HW.TS" displays the highway number and the time slot number, respectively, of a path.

Figure 5:
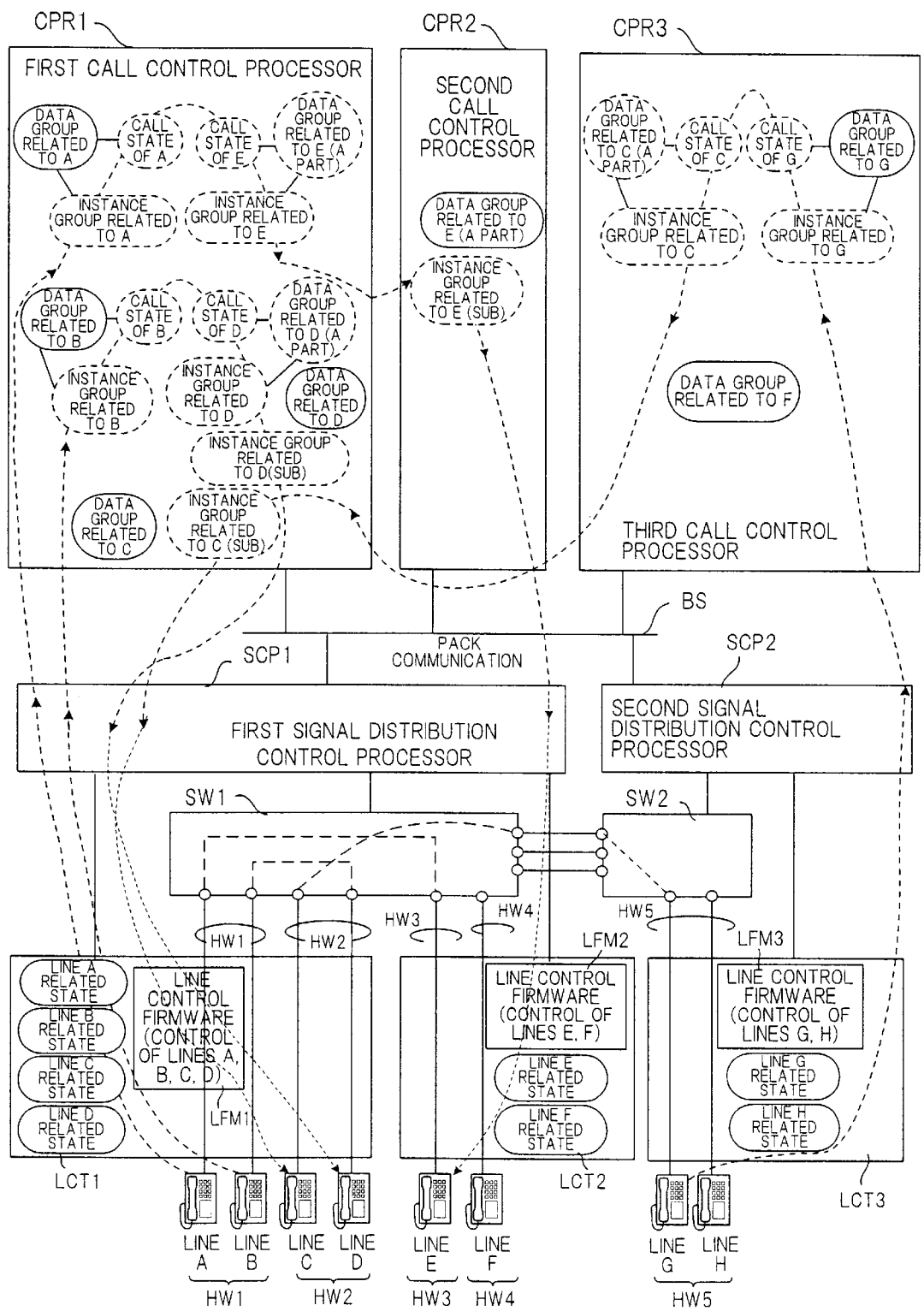
FIG. 5 is an explanatory view of the exchange processing of a multiprocessor exchange having a floating function.

(c) Call Processing of a Multiprocessor STM Exchange Provided with a Floating Function FIG. 5 is an explanatory view of a fundamental exchange processing of a multiprocessor exchange which is provided with a floating function and to which an object-directed software structure is introduced. The same reference numerals are provided for the elements which are the same as those shown in FIG. 1;

The multiprocessor STM exchange provided with a floating function shown in FIG. 5 is provided with line controllers LCT1 to LCT3 for collectively controlling a plurality of lines (subscriber lines/trunks), and the line controllers LCT1 to LCT3 are provided with line control hardwares (not shown) and the line control firmwares LMF1 to LMF3 for controlling the line control hardwares, in the same way as a conventional exchange. Lines A to D are connected to the line controller LCT1, lines E and F to the line controller LCT2, and lines G and H to the line controller LCT3. The lines A, B constitute a highway HW1, the lines C, D a highway HW2, the line E a highway HW3, the line F a highway HW4 and the lines G, H: a highway HW5. The firmwares LMF1 to LMF3 control the states of the physically connected lines and also control the transmission and reception of call control information (call control message) between the lines and the call control processors.

The multiprocessor exchange is provided with a multiplicity of call control processors CPR1 to CPR3 for executing a call processing which is the main part of an exchange operation. The call processing of the lines A to D (highways HW1 and HW2) is allocated to the call control processor CPR1, the call processing of the line E (highway HW3) is allocated to the call control processor CPR2, and the call processing of the lines F to H (highways HW4 and HW5) is allocated to the call control processor CPR3. Each call control processor executes the call processing of the allocated lines. The allocation of the lines to each call control processor is executed by inputting line allocation information from the terminal apparatus TML (see FIG. 2) to the call control processor CPR1, and distributing the line allocation information to all the processors and firmwares by the call control processor CPR1. Each processor and firmware stores the HW highway-call control processor allocation table shown in FIG. 6 on the basis of the input line allocation information.

The signal distribution control processors SCP1 and SCP2 are provided between the line controllers LCT1 to LCT3 and the call control processors CPR1 to CPR3, and all the operations which involve a physical control are executed through the signal distribution control processors SCP1 and SCP2. The signal distribution control processors SCP1 and SCP2 (1) distribute the messages received through the firmwares to the call control processors CPR1 to CPR3 by reference to the line allocation information (FIG. 6), (2) transmit the messages received from the call control processors CPR1 to CPR3 to the corresponding subordinate lines similarly by reference to the line allocation information, and (3) further connect a signal path by controlling the subordinate switches SW1, SW2. In this manner, it is possible to change the distribution of the load of call processing only by changing the line allocation based on the line allocation information in a maintenance procedure without the need for changing the physical line connection.

The flow of a call setting in this structure will be explained with the case of sending a signal from the line A, and receiving it by the line E taken as an example.

(1) A signal sent from the line A is received by the line control firmware LMF1 which is physically connected to the line A. (2) The line control firmware LMF1 which has received the transmission signal renews the state data on the line A which is held internally, and thereafter sends call control information (calling signal) input from the line A to the signal distribution control processor SCP1 which is physically connected to the line A through a signal path (PAC communication path). (3) The signal distribution control processor SCP1 sends call control information (calling signal) received from the line A to the call control processor CPR1 which is to execute a call setting processing of the line A by reference to the logical line allocation information (FIG. 6). (4) The call control processor CPR 1 which has received the call control information (calling signal); sent from the line A has the line information (subscriber data, etc.) on the line A, and produces temporary data including the call state of the line A for executing various analysis processings and a call control processing using the line information and the call control information on the line A.

(5) The call control processor CPR1 also judges that the destination line is the line E which is logically allocated to the call control processor CPR2 based upon the call control information from the line A. Thereafter, the call control processor CPR1 copies a part (the minimum information for executing the call setting processing) of the line information on the line E which is held by the call control processor CPR2 by PAC communication. This is executed in order to produce all the main part of the temporary data related to the call setting in one call control processor CPR1, thereby enhancing the call setting ability. Owing to this operation, it is possible to execute the call control between the lines A and E within the call control processor CPR1, thereby enhancing the call processing ability.

(6) After the end of the copying operation, the call control processor CPR1 produces temporary data including the call state of the line E for executing various analysis processings on the destination side and a call control processing on the basis of the copied information. (7) After the end of the proper preparation for call setting, the call control processor CPR 1 transmits the received signal to the line E through the call control processor CPR2. It is in order to check the maintenance information such as trouble information which is not directly related to a call control and blocked line information which is suitably changed that the signal is transmitted through the call control processor CPR2.

(8) The call control processor CPR2 which has received the signal directed to the line E confirms that the line E is in a state to receive a signal (not in trouble, or blocked), and thereafter it transmits the call control information (received signal) directed to the line E to the signal distribution control processor SCP1. (9) The signal distribution control processor SCP1 transmits the call control information (received signal) directed to the line E to the line control firmware LFM2 which controls the line E by reference to the line allocation information.

(10) The line control firmware LFM2 which has received the signal renews the state related to the line E, and then transmits the received signal.

Thereafter, a signal is transmitted and received between the lines A and E through the line A, the line control firmware LFM1, the signal distribution control processor SCP1, the call control processor CPR1, the call control processor CPR2, the signal distribution control processor SCP1, the line control firmware LFM2 and the line A, or by the reverse route.

The method of holding various data and the signal route in the case of sending a signal from the line A which is logically allocated to the call control processor CPR1 to the line E which is logically allocated to the call control processor CPR2 is described in the above. In a similar way, a signal is sent from the line B to the line D, or from the line G to the line C. However, the signal route is different as indicated by the dotted lines in FIG. 5, and the method of holding temporary data in the call control processors CPR1 to CPR3 is different in accordance with the difference in the position at which the call setting line is logically accommodated.

(C) Match Processing in a "Restart Processing with Relief"

(a) Problems Caused When a Conventional Match Processing is Applied to an Exchange According to the Present Invention The fundamental principle of the match processing in the multiprocessor exchange having a floating function shown in FIG. 5 is the same as the match processing in a conventional multiprocessor exchange. However, when a conventional match processing is applied to the multiprocessor exchange shown in FIG. 5, various problems are caused.

For example, in FIG. 5, when the signal distribution control processor SPC1 is required to execute a "restart processing with relief", the line controllers LCT1, LCT2 which are physically connected to the signal distribution control processor SPC1 are held in a call control stopping state and wait for the relief information issued from the processor. In this case, since the restarted signal distribution control processor SPC1 does not manage the call state which serves as the nucleus of the production of relief information, the actual match processing is executed by the call control processors CPR1 to CPR3 and the line control firmwares LFM1, LFM2 between which there is no direct physical connection. At this time, even the match processing of the line E is finished between the call control processor CPR2 and the line control firmware LFM2, for example, if the match processing of the line F is not finished between the call control processor CPR3 and the line control firmware LFM2, the line control firmware LFM2 does not assume a call control starting state, so that the line E remains unusable. In addition, if the match processing of the line F is not executed because of some trouble of the call control processor CPR3, the line E remains unusable even after the match processing of the line E has been finished.

When the call control processor CPR2 is required to execute a "restart processing with relief", the line control firmware LFM2 is held in a call control stopping state. Since the line control firmware LFM2 does not assume a call control starting state until the matching of the line E is finished, the line F which has no direct relationship with the call control processor CPR2 is involved and the call control by the line F is temporarily stopped.

Furthermore, when the line control firmware LFM2 is required to execute a "restart processing with relief", the line control firmware LFM2 is held in a call control stopping state and starts a match processing with the host processors (call control processors CPR2, CPR3). As described above, even after the match processing between the subordinate line E and the call control processor CPR2 is finished, the line E remains unusable until the match processing between the other subordinate line F and the call control processor CPR3 is finished.

(b) Match Processing in the "Restart Processing with Relief" According to the Present Invention In contrast, in the match processing in the "restart processing with relief" of the present invention, a call control is not stopped for each firmware as a whole unlike in a conventional processing, but it is stopped for each line or for each highway. This processing enables the call control on the lines or highways which are not related to a trouble. In short, this processing minimizes the lines which are not used when a processor (call control processor, signal distribution control processor) and a line control firmware is required to execute a "restart processing with relief", and shortens the relative time in which lines are not usable.

Figure 7:
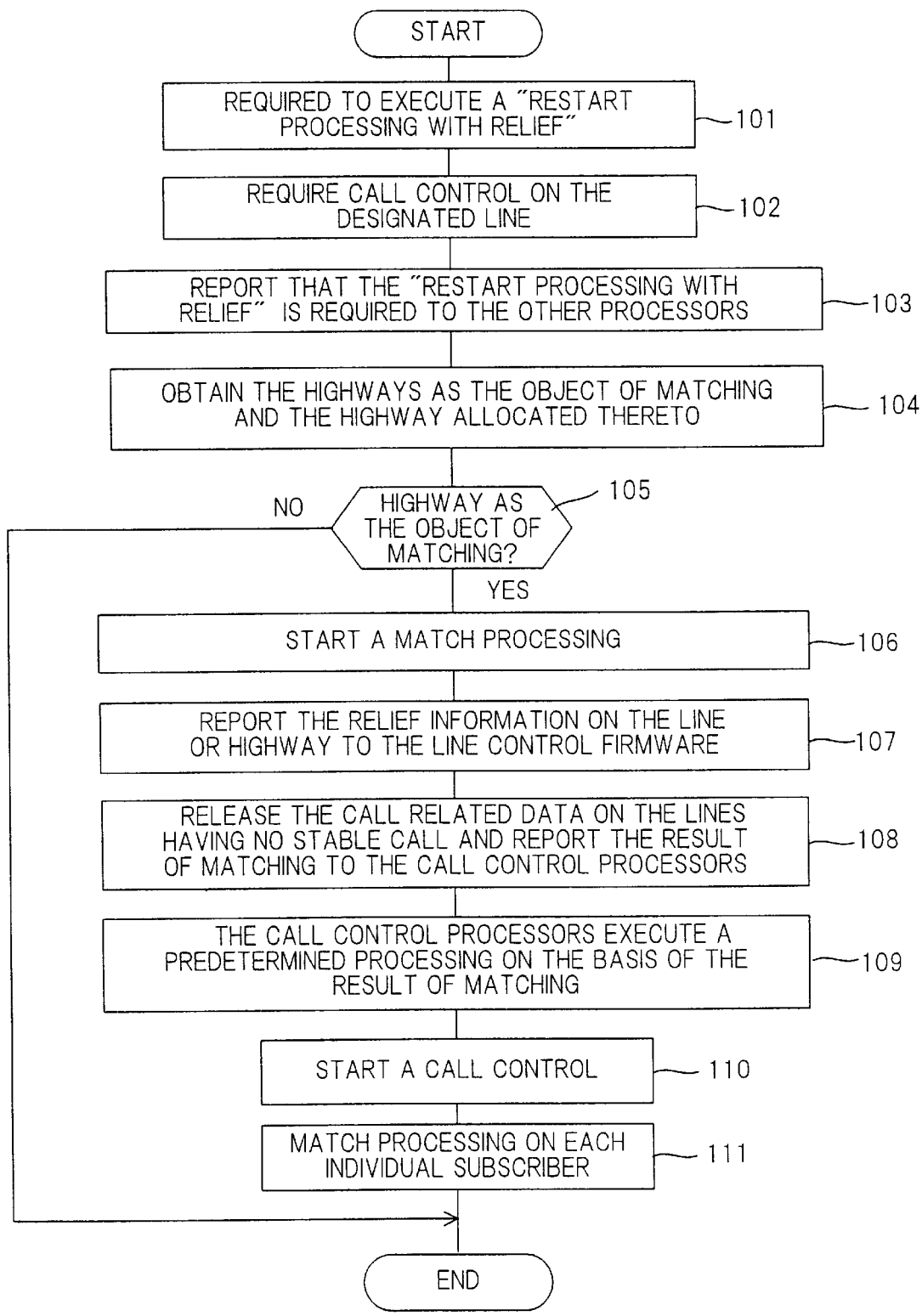
FIG. 7 is a flowchart of the match processing of a signal distribution control processor in "restart processing with relief"

(b-1) Match Processing by a Signal Distribution Control Processor at the Time of Restart Processing FIG. 7 is a flowchart of a match processing executed when a signal distribution control processor SPC1 executes a "restart processing with relief".

1) The signal distribution control processor SPC1 is required to execute a "restart processing with relief" (step 101)

2) The signal distribution control processor SPC1 requires the subordinate line control firmwares LFM1, LFM2 to stop the call control while designating the lines (step 102). In this case, the lines are designated in the minimum unit of lines which is used to logically allocat lines to a call control processor. For example, if the minimum unit in the line allocation information is one line (subscriber line, trunk), a call control is required to be stopped on a line individually, while if the minimum unit in the line allocation information is a highway (collection of lines), a call control is required to be stopped on a highway individually. That is to say, if lines are allocated collectively as a highway, as shown in FIG. 6, the signal distribution control processor SPC1 requires the line control firmware LFM1 to stop the call control of the highways HW1 and HW2, and the line control firmware LFM2 to stop the call control of the highways HW3 and HW4. The line control firmwares LFM1 and LFM2 control the call control stopping state on the respective highways. In the explanation hereinafter, it is assumed that the minimum unit in the line allocation information is a highway.

3) The signal distribution control processor SPC1 then reports that it is required to execute a "restart processing with relief" to the other processors, i.e., the call control processors CPR1 to CPR3 and the signal distribution control processor SPC2 (step 103).

4) The call control processors CPR1 to CPR3 and the signal distribution control processor SPC 2 which have received the information, obtain the highways HW1~HW4 as the object of matching which are physically connected to the signal distribution control processor SPC1 which has started the "restart processing with relief", from the known apparatus mounting state data. The call control processors CPR1 to CPR3 then obtain the highways which are allocated thereto from the table shown in FIG. 6 (s 104).

5) Thereafter, the call control processors CPR1 to CPR3 judge whether or not the highways allocated thereto are highways which are physically connected to the signal distribution control processor SPC1 as the object of matching (step 105). In the example shown in FIG. 6, (1) the highways HW1 and HW2 of the call control processor CPR1, (2) the highway HW3 of the call control processor CPR2 and (3) the highway HW4 of the call control processor CPR3 are the object of matching by the respective call control processors. Since no highway is logically allocated to the signal distribution control processor SPC2, the signal distribution control processor SPC2 has no highway as the object of matching.

6) If the highways allocated tereto are the objects of matching, the call control processors CPR1 to CPR3 start a match processing aimed at the relief of stable calls, with regard to the highway and first they check the matching of the internal data and execute the release (initialization) of the temporary data which are related to the calls other than stable calls (step 106).

7) The call control processors CPR1 to CPR3 then produce relief information with regard to the logical highways (lines) allocated thereto and send the relief information to the corresponding firmwares. The relief information includes (1) line information indicating the range of match processing (ex. the highways or lines allocated to the call control processors) and (2) information on stable calls (ex. list of subscribers as the object of matching) (step 107).

The list of subscribers as the object of matching includes (1) call processing type information (analog, CAS trunk, message trunk, etc.),
(2) terminal state information (talking, ringing, off-hook),
(3) path connection information (initial state, one-way path from the receiver to the caller, one-way path from the caller to the receiver, bidirectional paths between the caller and the receiver, path from the tone to the caller),
(4) terminal information,
(5) path information, and
(6) call identification information.

In the example shown in FIG. 5, the call control processor CPR1 sends the relief information for relieving stable call to the line control firmware LFM1 while designating the highways HW1 and HW2(lines A to D), the call control processor CPR2 sends the relief information for relieving stable call to the line control firmware LFM2 while designating the highway HW3(line E), and the call control processor CPR3 sends the relief information for relieving stable call to the line control firmware LFM2 while designating the highway HW4(line F).

8) The line control firmwares LFM1 and LFM2 which have received the relief information compare the state of the lines under their control with the received relief information, and release the call related data on the nonstable calls (calls other than stable calls) on the lines in the range of matching. Furthermore, if calls are regarded as not the object of relief by the firmwares, they are always reported to the host processors in the form of non-relief information, even if they are contained as stable calls in the relief information (step 108).

For example, in the match processing, the call control on the lines as the object of matching is stopped. Therefore, when the call in the course of talking through a line as the object of matching is finished, the line state held by the line control firmware does not agree with the line state held by the call control processor. That is, the call which the call control processor regards as a stable call in the course of talking is regarded as a nonstable call which is not the object of relief by the firmware. In such a case, the line control firmware reports non-relief information to the host processor as a result of matching.

When the receiver answers the call in the course of ringing through a line as the object of matching, the line state held by the line control firmware does not agree with the line state held by the call control processor. That is, the call which the call control processor regards as a call in the course of ringing is regarded as a call in the course of talking by the firmware. In such a case, the line control firmware reports state disagreement information to the host processor as-a result of matching.

9) The call control processors CPR1 to CPR3 receive the results of matching from the firmwares LFM1 and LFM2, and if non-relief information is included therein, the call control processors CPR1 to CPR3 release the call controlling temporary data on the stable calls which are specified by the non-relief information. If state disagreement information is included therein, the call control processors agree the states (step 109).

10) The call control processors CPR1 to CPR3 then requires the firmwares LFM1 and LFM2 to start a call control while successively designating the lines on which the match processing is finished. The firmwares also successively change the state of each of the designated lines from the call control stopping state to the call state starting state (step 110).

11) Finally, in the case of a digital subscriber (BRI/PRI), since the subscriber has a call state, a message (Status-enq) is transmitted to the subscriber in accordance with the advice so as to execute a match processing on the subscriber individually.

In the above explanation, the minimum unit in the line allocation information is a highway. A similar processing is also executed when the minimum unit is a line.

(b-2) Match Processing at the Time of a Restart Processing by a Call Control Processor A match processing executed when the call control processor CPR2 is required to execute a "restart processing with relief" will be explained in accordance with the flowchart shown in FIG. 8. Since the match processing is fundamentally the same as the restart processing by the signal distribution control processor SPC1 shown in FIG. 7, the difference will be mainly explained in the following.

1) The call control processor CPR2 is required to execute a "restart processing with relief" (step 121).

2) The call control processor CPR2 requires the subordinate line control firmware LFM2 to stop the call control while designating the lines (step 122). The lines are designated by reference to the table shown in FIG. 6. In the example shown in FIG. 6, only the highway HW3 is designated. Since the highway HW4 in the same line control firmware LFM2 is not the object of call stop processing, the line F is usable without any problem. The firmware LFM2 which is required to stop the call control controls the call control stopping state on each highway HW3.

3) The call control processor CPR2 starts a match processing aimed at the relief of stable calls on the highway HW3 logically allocated thereto, and first checks the matching of the internal data and executes the release (initialization) of the temporary data which are related to the calls other than the stable calls (step 123).

4) The same steps as the steps 107~111, in the flowchart shown in FIG.7 are executed (steps 124 to 128).

The match processing in the "restart processing with relief" executed by the other call control processors CPR1, CPR2 is similar to the above-described processing.

Figure 9:
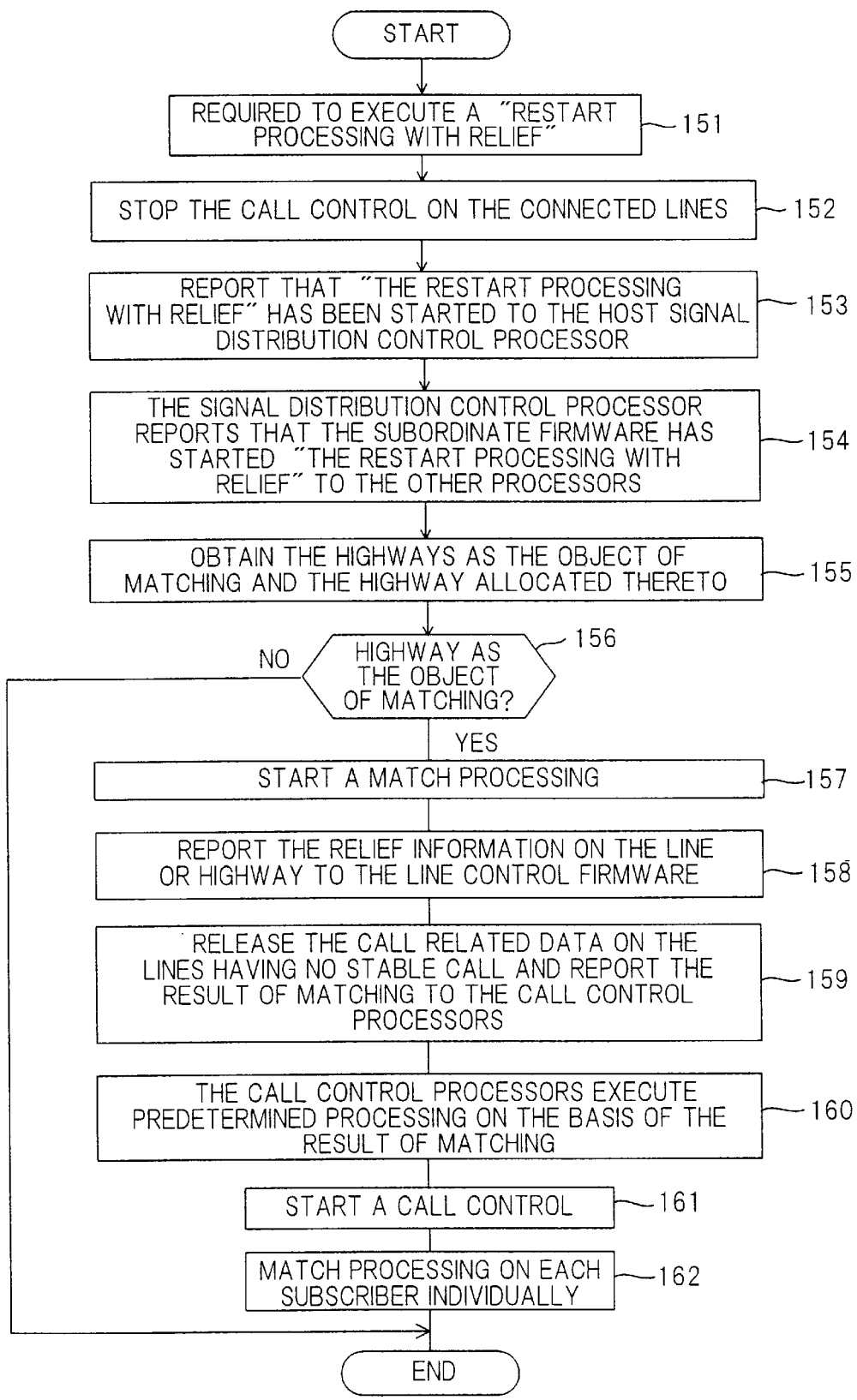
FIG. 9 is a flowchart of the match processing of a line control firmware in a "restart processing with relief"

(b-3) Match Processing at the Time of a Restart Processing by a Line Control Firmware A match processing executed when the line control firmware LFM2 is required to execute a "restart processing with relief" will be explained in accordance with the flowchart shown in FIG. 9. Since the match processing is fundamentally the same as the restart processing by the signal distribution control processor SPC1 shown in FIG. 7, the difference will be mainly explained in the following.

1) The line control firmware LFM2 is required to execute a "restart processing with relief" (step 151).

2) In the "restart processing with relief", the firmware LFM2 changes the call control state of the highways HW3 and HW4 which are controlled individually into the call control stopped state (step 152). The firmware LFM2 further reports that it has started the restart processing to the signal distribution control processor SPC1 which is the directly connected host processor (step 153).

3) The signal distribution control processor SPC1 reports that the subordinate firmware LFM2 has started the "restart processing with relief" to the other processors (the call control processors CPR1 to CPR3 and the signal distribution control processor SPC 2 in this case) (step 154).

4) The call control processors CPR1 to CPR3 and the signal distribution control processor SPC 2 which have received the information, obtain the highways as the object of matching which are controlled by the firmware LFM2 from a known apparatus mounting state data. The call control processors CPR1 to CPR3 and the signal distribution control processor SPC2 then obtain the highways which are allocated thereto from the table shown in FIG. 6 (step 155).

5) Thereafter, the call control processors CPR1 to CPR3 and the signal distribution control processor SPC2 judge whether or not the highways allocated thereto are highways which are controlled by the line control firmware LFM2 as the object of matching (step 156). In this case, (1) the highways HW3 of the call control processor CPR2 and (2) the highway HW4 of the call control processor CPR3 are the highways as the object of matching, but the other highways are not the object of matching.

6) If the highways allocated thereto are the object of matching, the call control processors CPR1 to CPR3 start a match processing aimed at the relief of stable calls with regard to the highways, and check the matching of the internal data and execute the release (initialization) of the temporary data which are related to the calls other than stable calls (step 157).

7) The same steps as the steps 107~111 in the flowchart shown in FIG. 7 are executed (steps 158 to 162).

The match processing between call control processors and line control firmwares is as described above. It is possible to execute a match processing between a call control processor and another call control processor by PAC communication in the same way as in the conventional apparatus.

(c) Mechanism of the Control for Each Highway

In the match processing at the time of restart processing with relief, a line control firmware is able to control for each highway. For example, the firmware LFM 2 is able to execute a match processing while stopping the call control only on the highway HW3 without stopping the call control on the other highway HW4. This mechanism will be explained.

When a processor is required to execute a "restart processing with relief", a firmware executes a match processing for each highway individually. What is executed concretely by a firmware is broadly classified into the following (1) to (3).

(1) Call Control Stop Processing Executed for Each Highway

When a match processing is started for each highway individually based on the request from the host processor, a firmware executes the call control stop processing on each highway individually. The "call control stop" means to omit the process of monitoring the change information (ex. calling, cutting) sent from the lines during the match processing. However, the contents of the memory for storing the line state are updated in accordance with the change information from the lines. For example, "talking" in the memory is changed into "off-hook" when the talking is finished.

(2) State Disagreement Confirm Processing (Match Processing) for Each Highway Between a Processor and a Firmware A firmware compares the relief information transmitted from the host processor with the call state (ex. talking/ringing/off-hook, etc.) and the path connection state which are held in the: firmware, and if the firmware holds the line information (call state/path connection state) of a call other than stable call, it clears the information. In addition, if a line of a stable call which is included in the relief information sent from the host processor is not recognized as the object of relief by the firmware, the firmware reports the line to the processor in the form of non-relief information.

(3) Call Control Start Processing Executed for Each Highway

After the end of the match processing for each highway based upon the request from the host processor, the call control start processing is executed for each highway. The "call control start" means to start the monitoring of the change information (ex. calling/cutting) sent from the lines after the match processing.

Figure 10:
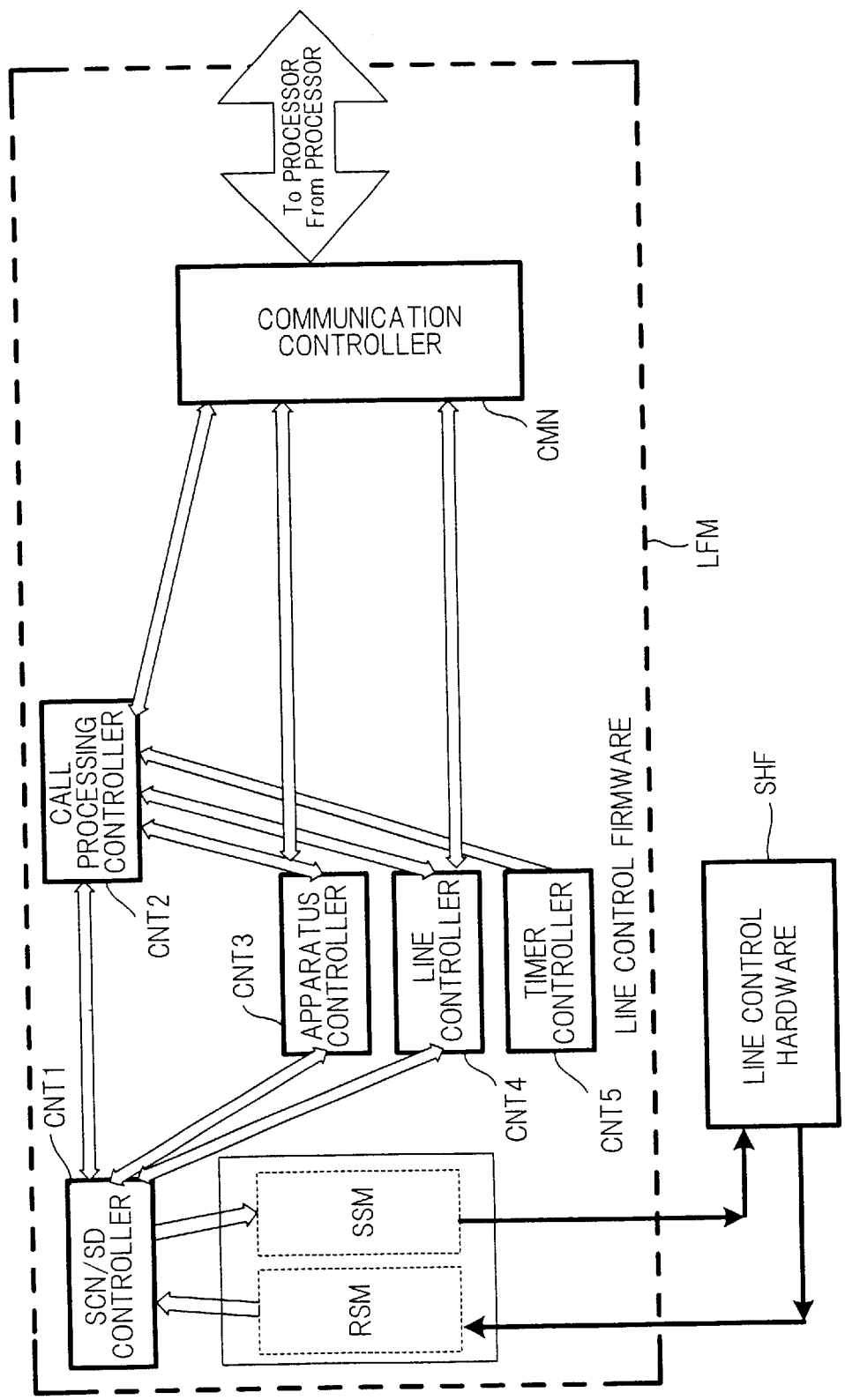
FIG. 10 is a function diagram of a firmware.

The processings of the "call control stop" and "call control start" executed for each highway individually will be explained in the following with reference to FIG. 10. FIG. 10 is a functional diagram of a line control firmware, wherein the symbol LFM denotes a line control firmware and SHF a line control hardware. In the firmware LFM, the symbol RSM denotes a signal reception memory, SSM a signal transmission memory, CNT1 an SCN/SD controller (scan/sending data controller), CNT2 a call processing controller, CNT3 an apparatus controller, CNT4 a line controller, CNT5 a timer controller, and CMN a communication controller. The signal reception memory RSM stores the signalling information which is call control information (ex. on-hook, off-hook, dialed number, apparatus/line trouble information, etc.) for each highway and which is reported to the firmware by the line control hardware SHF, in the form of the on/off of the corresponding bits. The signal transmission memory stores the signalling information for each highway which is reported to the line control hardware SHF by the firmware LFM in the form of the on/off of the corresponding bits.

The communication between the firmware LFM and the line control hardware SHF is executed by transmitting and receiving signalling information through the signal reception memory RSM and the signal transmission memory SSM. More specifically, the transmission of sending data SD from the firmware LFM to the line control hardware SHF is executed by writing the sending data SD in the storage area of the signal transmission memory SSM which corresponds to the highway of the line control hardware SHF by turning on/off the corresponding bits under the control of the SCN/SD controller CNT1.

The transmission of the sending data SD from the line control hardware SHF to the line control firmware LFM is executed by (1) writing the information transmitted from the hardware in the storage area of the signal reception memory RSM which corresponds to the highway of the line control hardware SHF by turning on/off the corresponding bits, (2) periodically scanning the information by the SCN/SD controller CNT1, and (3) sending the information to the related controllers CT2 to CT5. More concretely, the information transmitted from the line control hardware SHF is stored in the signal reception memory RSM in the form of bit allocation (arrangement of on/off of the bits, each bit having a meaning). The SCN/SD controller CNT1 scans the information periodically, for example, every 8 ms or 16 ms, compares the current information with the preceding information scanned from the signal reception memory RSM, judges the content of the bit which is changed, and reports the content of a change to the related controller among the call processing controller CNT2, apparatus controller CNT3 and line controller CNT4 (last look processing).

When the call control stop for each highway is required by the processor, the SCN/SD controller CNT1 sets the designated highway as the object of call control stop, and further masks the monitored portion of the signal reception memory RSM which corresponds to the highway so as to remove the highway from the object of monitoring (omission of the last look processing on the designated highway). Since the information on the highway HW1 is written into the addresses 20 to 30 of the signal reception memory, in order to stop the call control on the highway HW1, the addresses 20 to 30 as the monitored portion of the signal reception memory RSM are masked so as not to be monitored.

On the other hand, when the call control start for each highway is required by the processor, the SCN/SD controller CNT1 starts the call control on the designated highway, further removes the mask from the monitored portion of the signal reception memory RSM which corresponds to the highway, and executes the ordinary monitor processing (starting of the last look processing on the designated highway).

(D) Match Processing at the Time of Change in Line Allocation (Shift)

A match processing for relieving a stable call (ex. ringing call, talking call) will be explained in the case of shifting a highway having the stable call in a multiprocessor STM having a floating function. FIGS. 11 to 16 are explanatory views of a match processing aimed at relief of a stable call at the time of shift. In the drawings, a call control processor is grown, and a highway having a stable call is shifted to the new call control processor. A match processing is executed so as to relieve the stable call. Since the relieve of a stable call is executed at the time of growth or degrowth of a call control processor, it is operated by the maintenance man.

Figure 11:
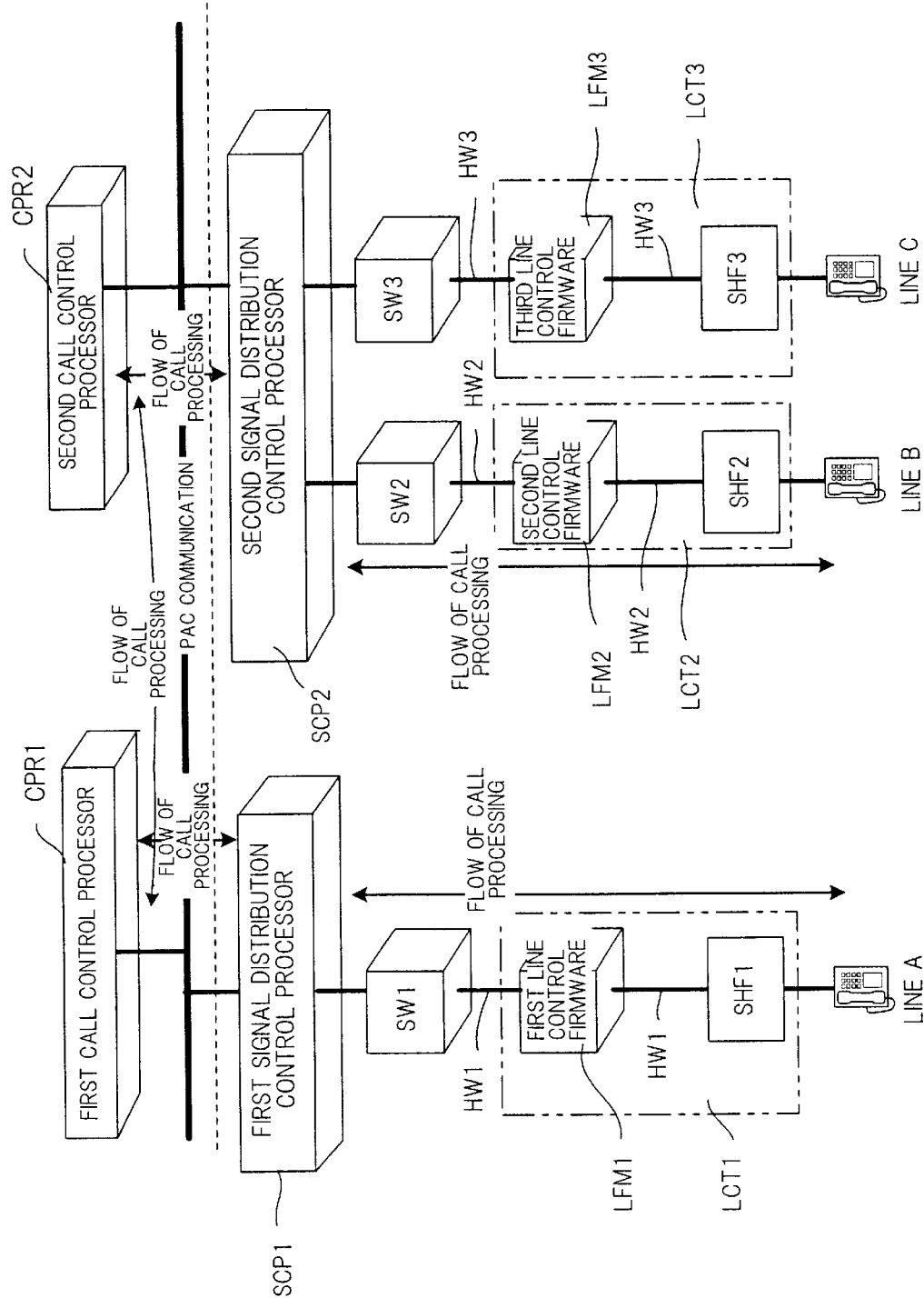
FIG. 11 is an explanatory view of a first match processing at the time of shift.

1) At the time of initiation, the line A is accommodated in the highway HW1, and the call control processor CPR1 manages the line information, while the line B is accommodated in the highway HW2, and the call control processor CPR2 manages the line information, as shown in FIG. 11. The line C is accommodated in the call control processor CPR1. The lines A and B communicate with each other through the line control firmware LFM1, the highway HW1, the signal distribution control processor SCP1, the call control processor CPR1, the call control processor CPR2, the signal distribution control processor SCP2, the highway HW2 and the line control firmware LFM2, or by the reverse route.

Figure 12:
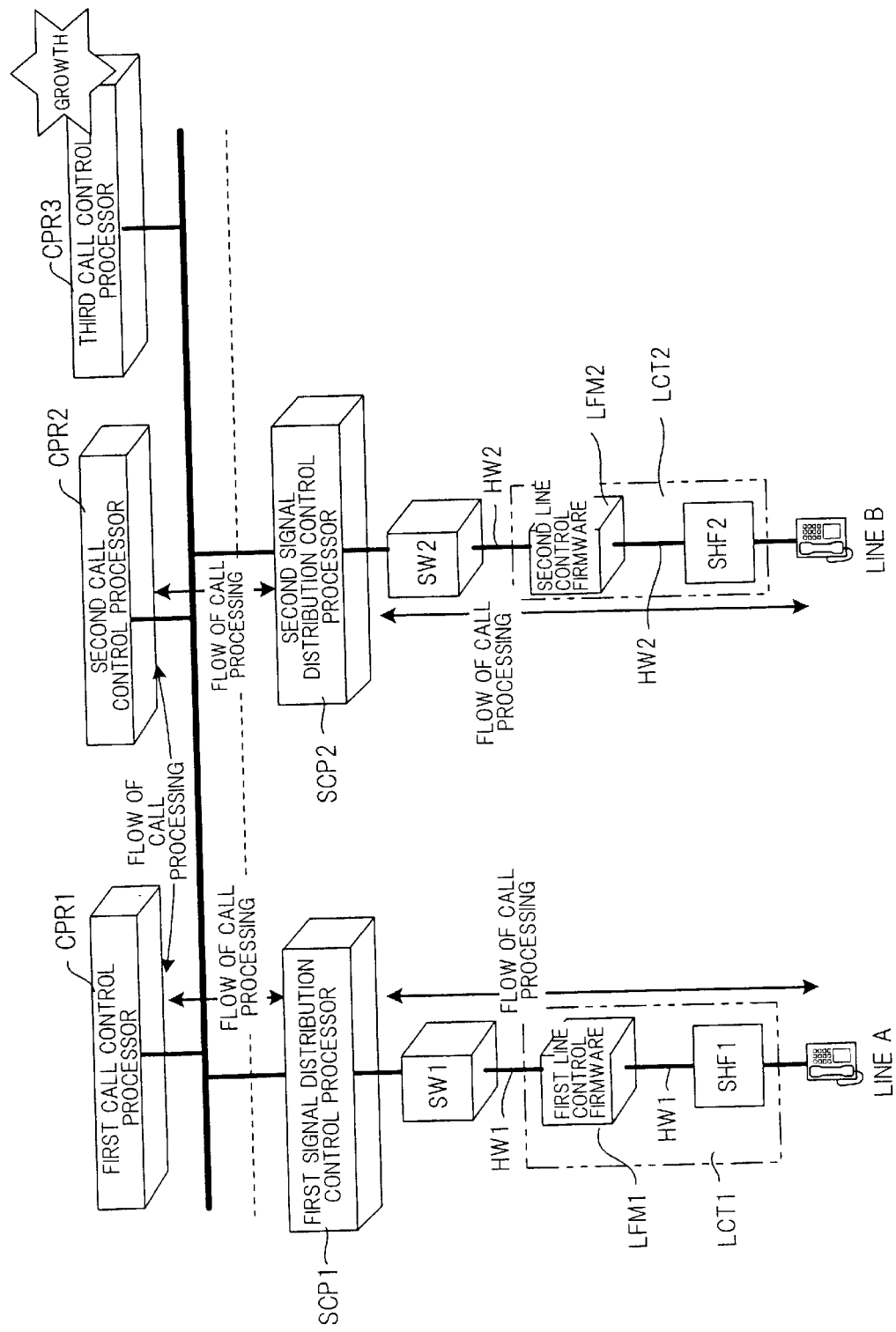
FIG. 12 is an explanatory view of a second match processing at the time of shift.

2) In this state, the call control processor CPR3 is grown (see FIG. 12).

Figure 13:
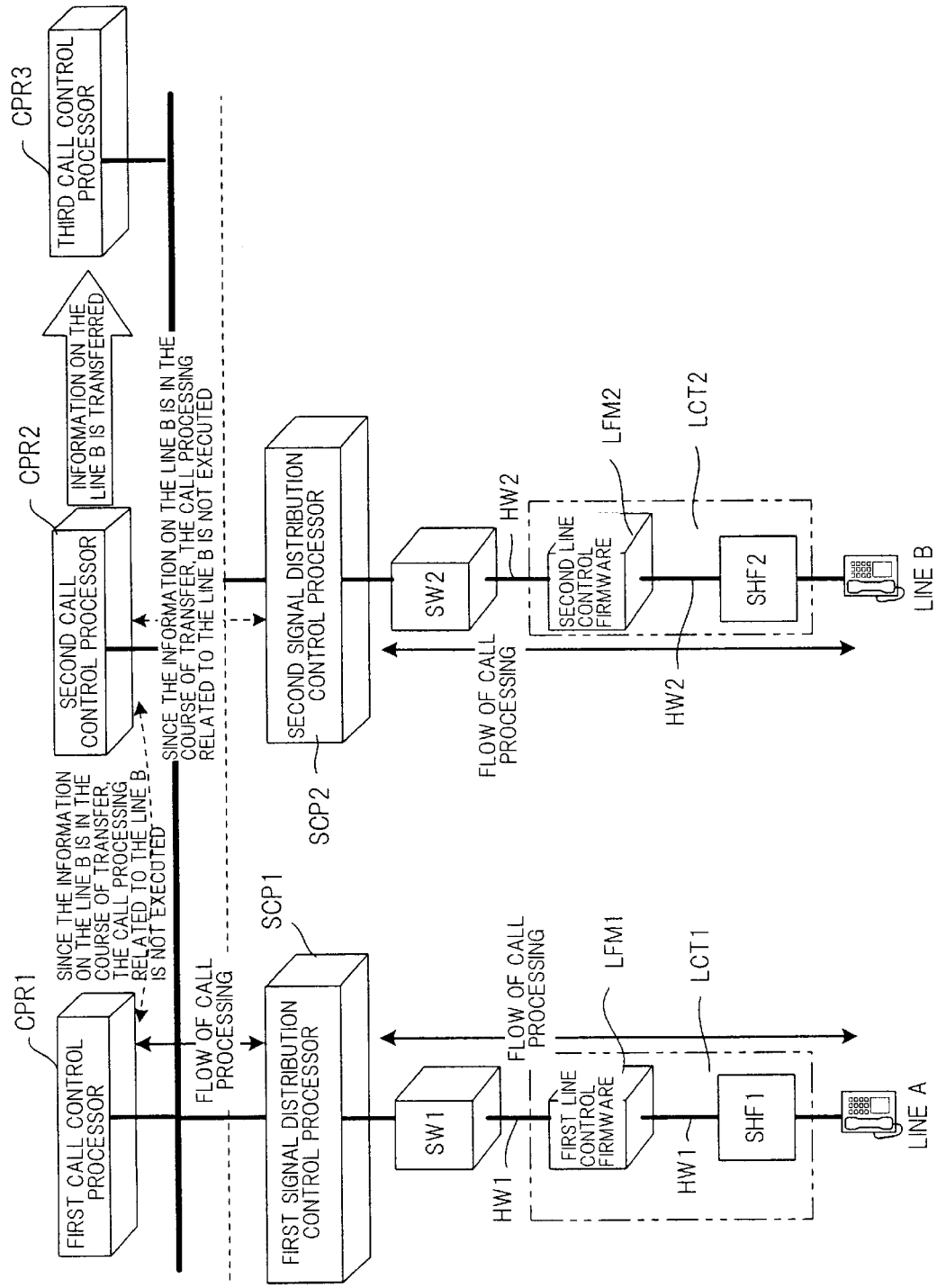
FIG. 13 is an explanatory view of a third match processing at the time of shift.

3) After the growth, in order to shift the control of the line B accommodated in the call control processor CPR2 to the call control processor CPR3, the call control processor CPR2 transfers the call control information (call state information, line information) to the call control processor CPR3 in accordance with the command input by the maintenance man, while holding the communication of the stable call between the lines A and B (see FIG. 13).

The command input by the maintenance man includes logical line allocation information for designating the call control processors CPR1 to CPR3 to which the respective highways are allocated. When the command is input, the call control processor CPR2 produces a highway-call control processor conversion table (see FIG. 17A), compares the new table with the preceding table (see FIG. 17B), and grasps the highway HW2 which is to be shifted among the highways allocated thereto. Thereafter, the call control processor CPR2 transfers the call control information related to the designated highway HW2 to be shifted to the call control processor CPR3 to which the highway HW2 is to be shifted.

Figure 14:
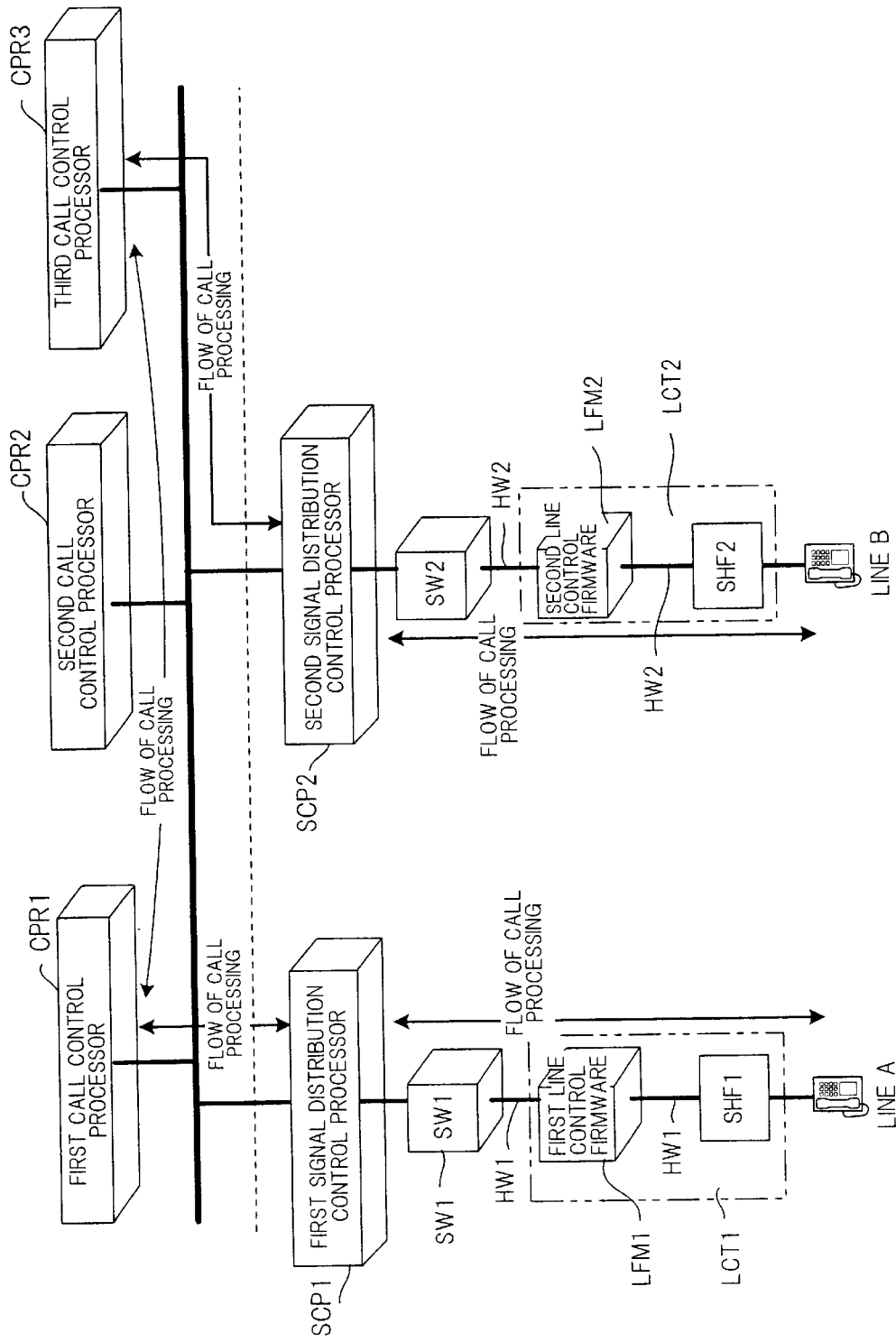
FIG. 14 is an explanatory view of a fourth match processing at the time of shift.

4) At the same time with the end of transfer of the call control information, the control of a call is shifted from the original call control processor CPR2 to the new call control processor CPR3, so that the CPR3 thereafter executes the call processing (see FIG. 14). The original call control processor CPR2 discards the call control information which has been transferred to the call control processor CPR3.

Figure 15:
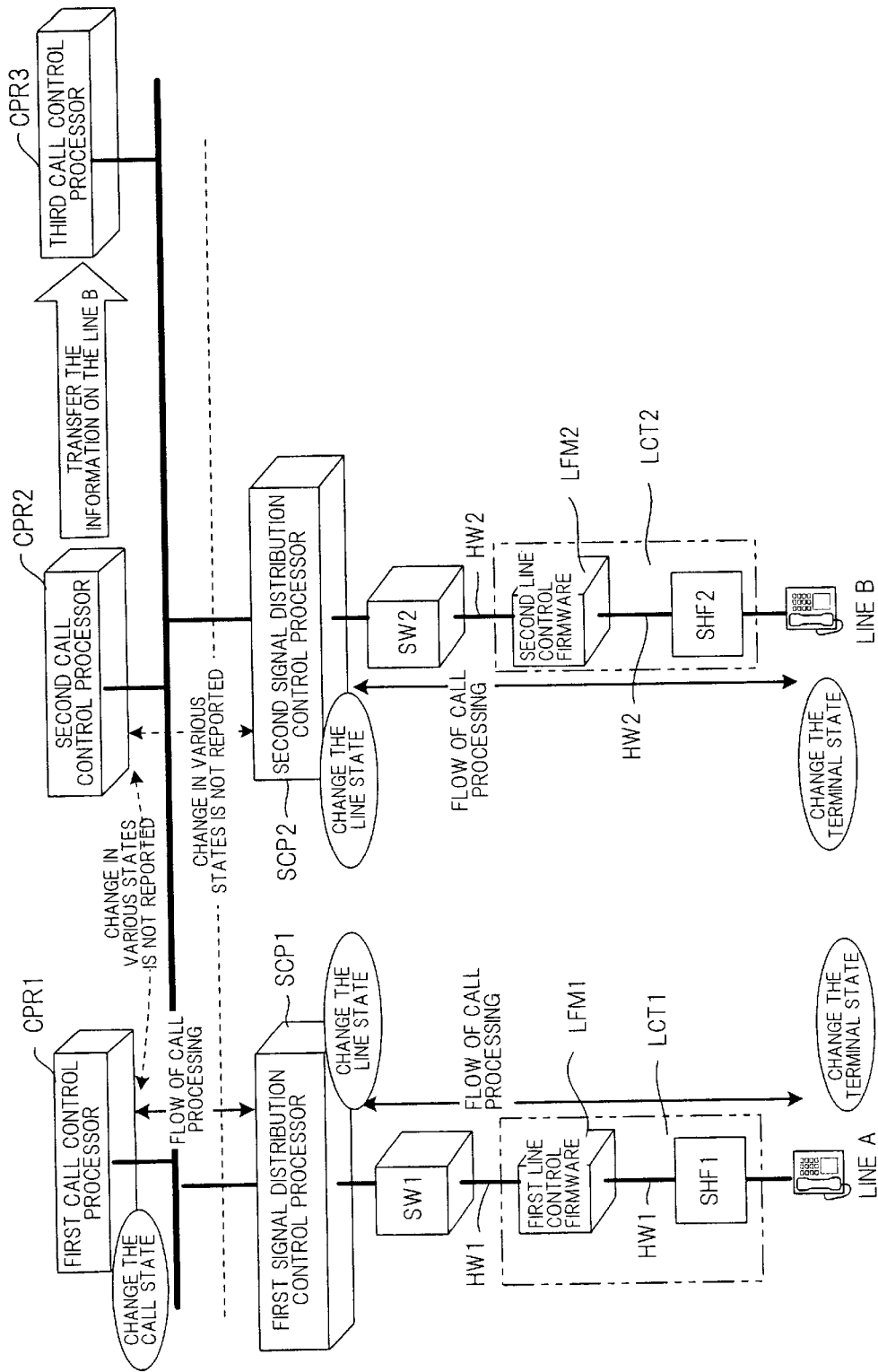
FIG. 15 is an explanatory view of a fifth match processing at the time of shift.

5) If a stable call between the lines A and B is required to change the call state (ex. answer, disconnect, abandon, etc.) while the call control information is being transferred from the call control processor CPR2 to the call control processor CPR3, the processors in the vicinity recognize that the data of the call control processor CPR2 is in the middle of transfer, and discard the call control message directed to the call control processor CPR2 without sending it (see FIG. 15). However, each processor executes a change of the state (line state, call state, etc.) held internally.

For example, if the signal distribution control processors SCP1 to SCP2, which distribute the message to the call control processors CPR1 to CPR3 by reference to the conversion table shown in FIG. 17A, receive a call control message related to the highway HW2 on which a transfer flag is ON from the line control firmware LFM2, they discard the message without sending it to the call control processor CPR2. The call control processor CPR1 other than the processor which transfers the information does not execute a call processing on the call control processor CPR2 in the course of transfer of data by reference to the conversion table.

Figure 16:
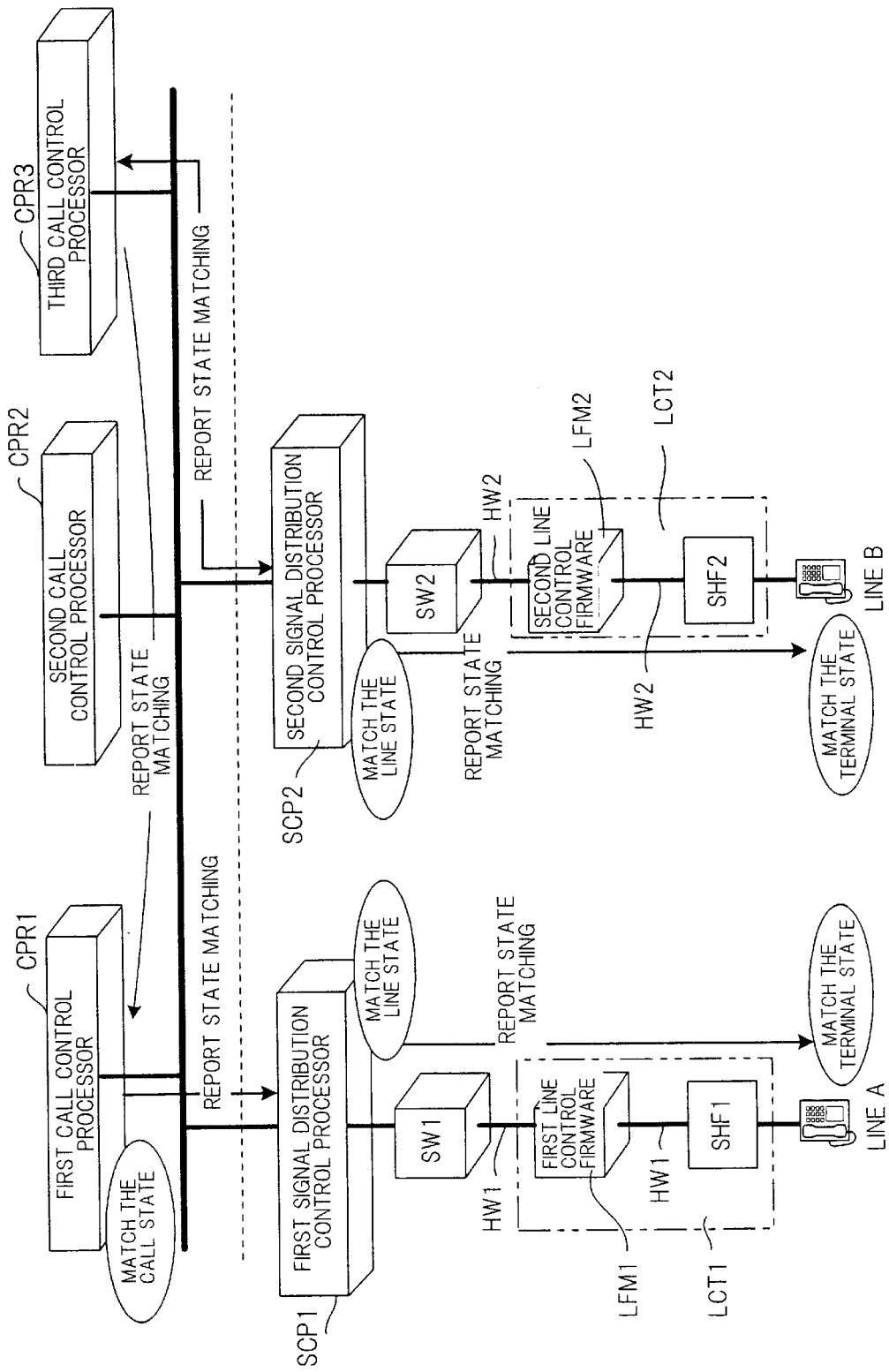
FIG. 16 is an explanatory view of a sixth match processing at the time of shift.

6) When the transfer of the call control information from the call control processor CPR2 to the call control processor CPR3 is finished, the control right on the call between the lines A and B is moved to the call control processor CPR3, and the call control processor CPR3 requires each of the processor CPR1 and the line control firmware LFM2 which correspond to a stable call between the lines A and B to match the line state (see FIG. 16).

Figure 8:
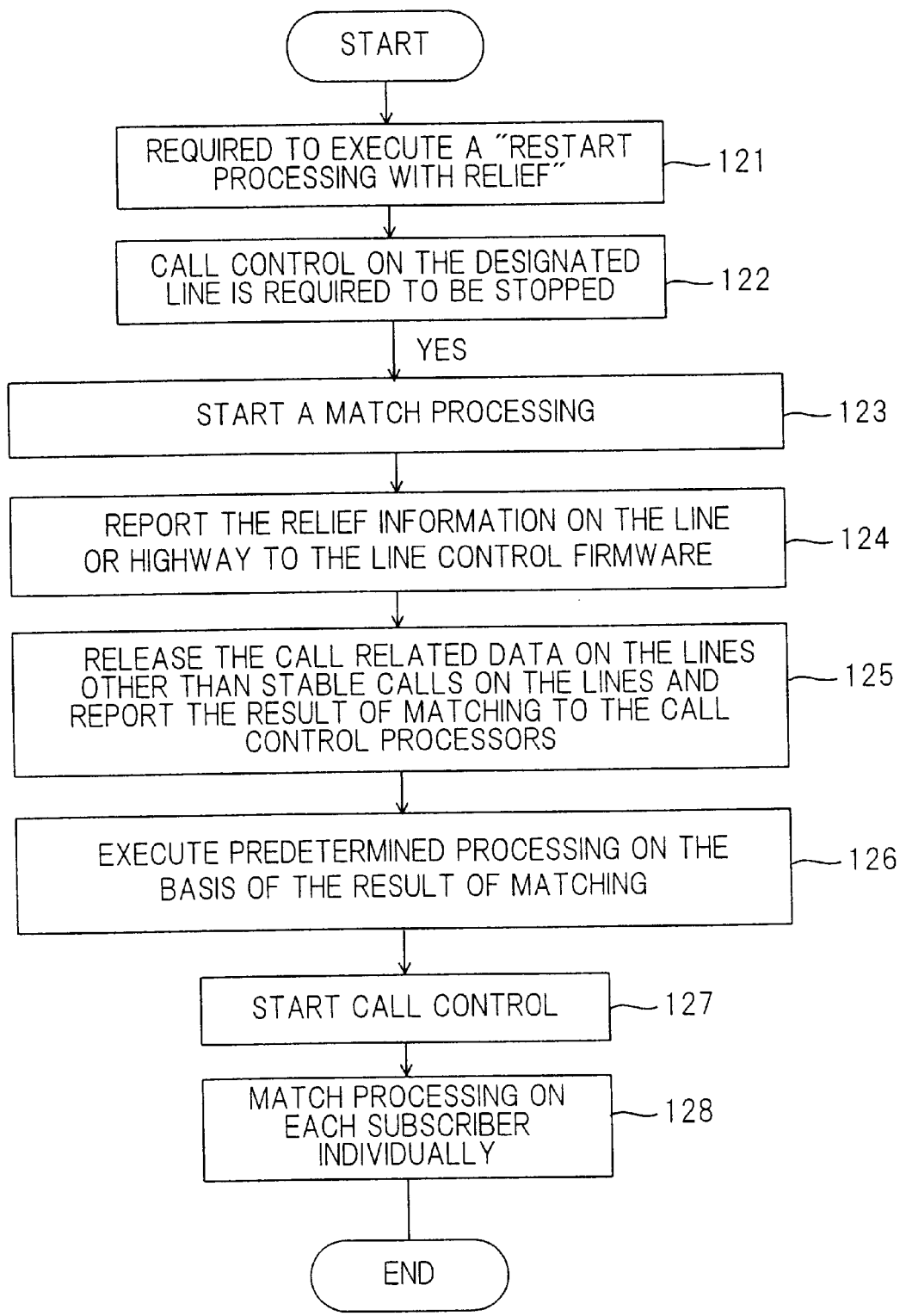
FIG. 8 is a flowchart of the match processing of a call control processor in a "restart processing with relief"

7) The line control firmware LFM2 which has received the request for state matching executes a match processing in accordance with FIG. 8. The call control processor CPR1 which has received the request for state matching compares it own call control information with the call control information which the call control processor CPR3 has, and if there is a difference, the call control processor CPR1 executes a match processing, and reports the result of the match processing to the call control processor CPR3.

8) The call control processor CPR3 which has received the report, changes the call control state thereof in accordance with the result of the match processing.

Figure 18:
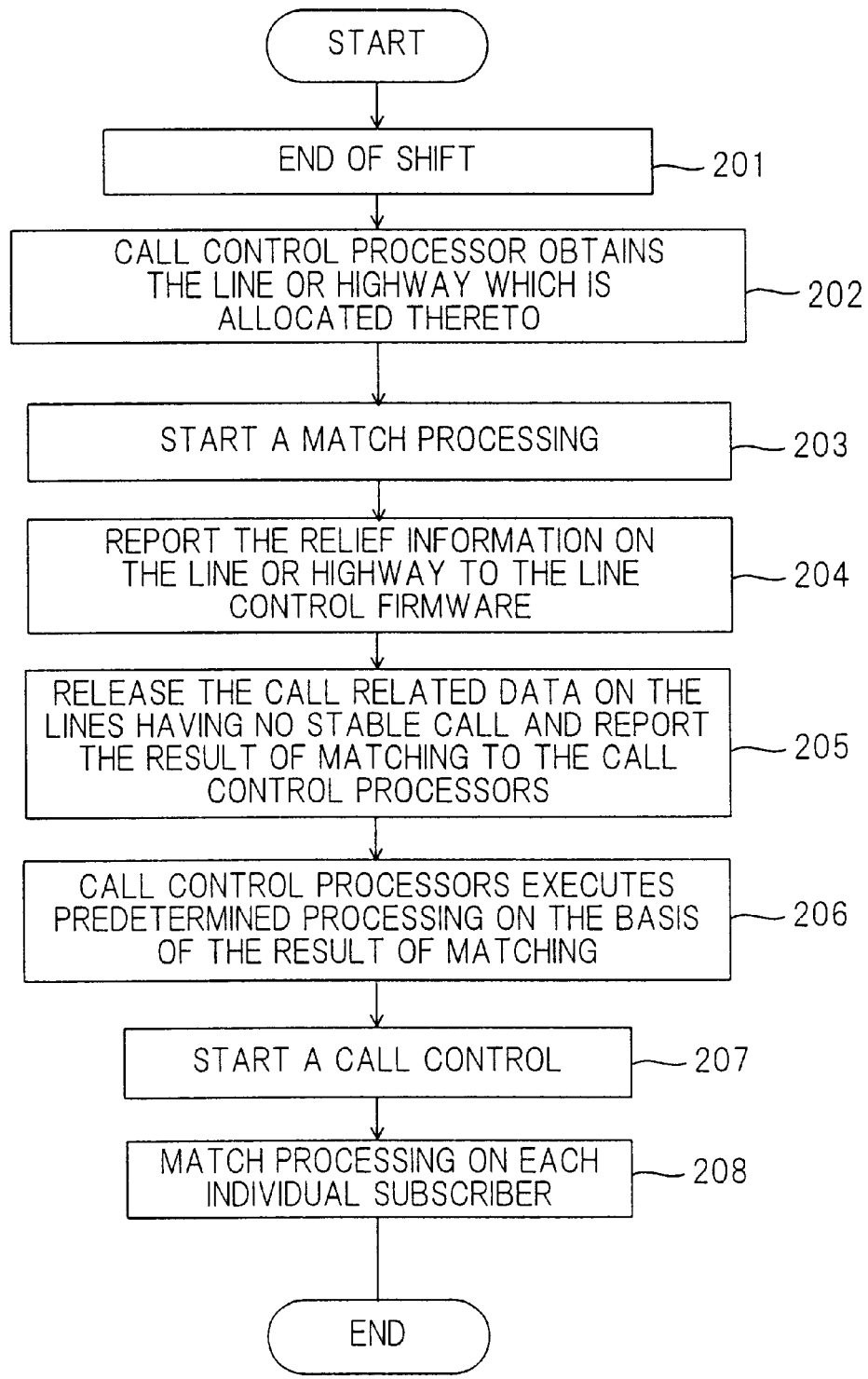
FIG. 18 is a flowchart of a match processing at the time of shift.

The processing executed at the time of shift is as described above. It is possible to execute the above-described match processing in a similar way to the match processing in the "restart processing with relief". FIG. 18 is a flowchart of the match processing between the call control processor CPR3 and the line control firmware LFM2 at the time of shift.

When the transfer of the call control data from the call control processor CPR2 to the call control processor CPR3 is finished, that is, when shift is finished (step 201), the call control processor CPR3 obtains the line or the highway allocated thereto (step 202). The call control processor CPR3 then starts the match processing aimed at the relief of a stable call in the match processing (step 203), releases the call related data on the line corresponding to a nonstable call in the match processing, and produces relief information for relieving a stable call and sends the information to the line control firmware LFM2 (step 204)

The line control firmware LFM2 (1) releases the call related data on the line which has a nonstable call, (2) and produces non-relief information on the lines which the line control firmware LFM2 judges to be a line other than an object of relief, even if they have a stable call, and sends the non-relief information to the call control processor CPR3 (step 205)

The call control processor CPR3 releases the call related data on the line designated by the non-relief information (step 206), and starts a call control (step 207). In the case of a digital subscriber (BRI/PRI), since the subscriber has a call state, the call control processor CPR3 sends a message (Status-enq) so as to execute a match processing on each subscriber individually (step 208). The processing after the step 203 is the same as the processing after the step 106 in FIG. 7.

(E) Match Processing at the Time of Generic Update

At the time of generic update in a multiprocessor STM exchange having a floating function, data transfer from the old system to a new system and data conversion/modification are executed during the operation of the old system. At this time, whenever data are changed in the old system, only the different data are transferred from the old system to the new system a plurality of times. Owing to this transfer of the different data, it is possible for the new system to take over the state of the old system, thereby enabling the relief of a call in a stable state (in the course of ringing/talking).

Figure 19:
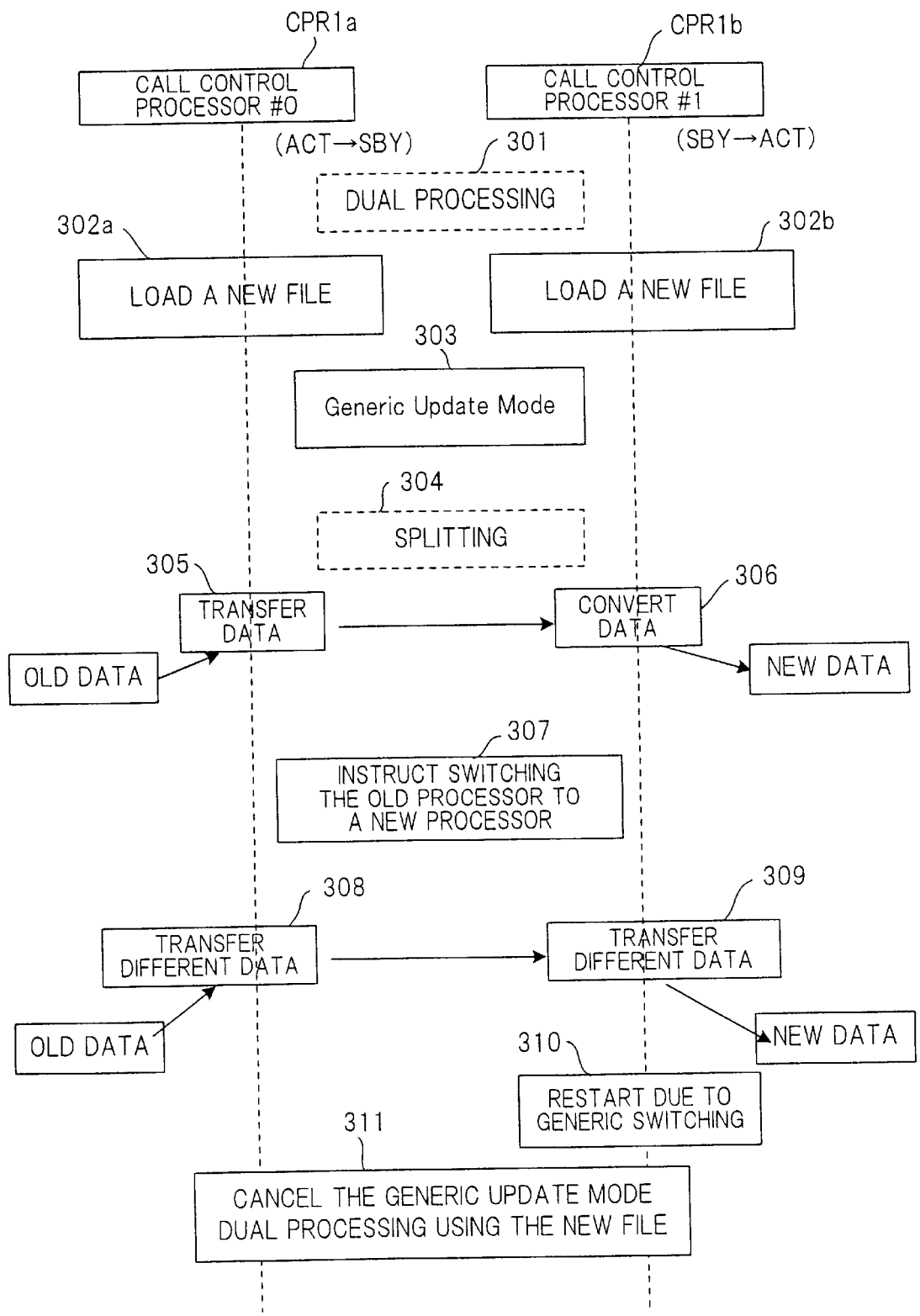
FIG. 19 is an explanatory view of the generic update procedure in a multiprocessor exchange having a floating function.

FIG. 19 is a schematic explanatory view of the generic update procedure in a multiprocessor exchange having a floating function. In the drawing, the symbol CPR1$a$ denotes a #0-processor, and CPR1$b$ a #1-processor.

In the beginning, the #0-processor CPR1$a$ serves as an active system, the #1-processor CPR2$a$ as a standby system, and both call control processors CPR1$a$ and CPR2$a$ execute the same processing so that the contents of the active and standby memories are the same (dual processing 301). If upgrading becomes necessary during such dual processing, a new file is stored in the memories of both the active processor CPR1a and the standby processor CPR1b on the request of the maintenance man (load of a new file 302a, 302b). After the load of a new file, the system is changed to a generic update mode (303) on the request of the maintenance man, and only the old system (#0) is operated, while the new system (#1) is kept out of service (OUS). Then, on the request of the maintenance man, the split processing of the system is restarted so that the active data (old data) are transferred to the new file, thereby enabling dual operation (304). That is, the active call control processor CPR1a continues to execute the exchange service based on the old file and also transfers the active data (old data) to the standby call control processor CPR1b (305). The standby call control processor CPR1b receives the active data (old data), and converts the old data into new data so that the new file can utilizes(306).

Thereafter, on the request of the maintenance man, switching to a new generic is accepted (307). The system which has accepted the request for switching executes a mask processing for prohibition of the reloading of the active data and prohibition of the production of a call processing task, and keeps the state in which a change of the state from the outside is not accepted. As to the call control, however, the call already started at this point of time is not forcibly disconnect.

The different data generated between the transfer of the active data (305) and the acceptance of a request for switching to a new generic (307) are transferred from the old (#0-) system to the new (#1-) system. That is, since the transfer of data and the conversion processing takes a long time, the active call control processor CPR1a executes the exchange service in this period on the basis of the old file, thereby changing the old data. For this reason, a difference is produced between the transferred old data and the latest old data. Accordingly, the active call control processor CPR1a transfers the different data, and the standby call control processor CPR1b converts the different data into new data (309). The different data generate when the active data are changed by the operation of the maintenance man, and when the active data are changed by the change of the state in an apparatus/line in the system.

After the end of the transfer of the different data, the new (#1-) call control processor CPR1b is in a in-service state and executes a "restart processing due to generic switching" (310), while the old (#1-) processor CPR1b is out of service.

After the end of the restart processing due to generic switching, the generic update mode is cancelled, and the dual processing using the new file is restarted (311).

Figure 20:
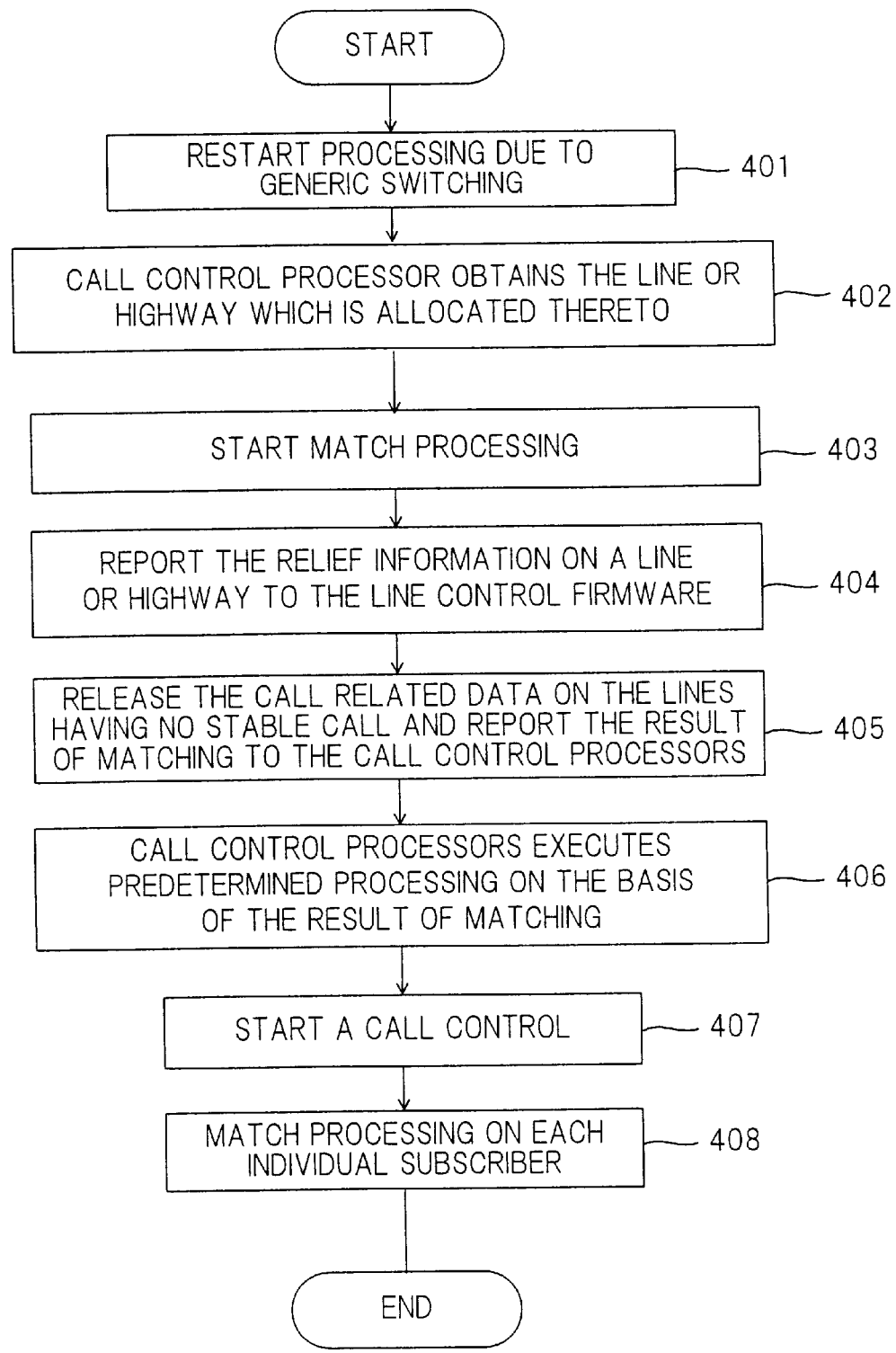
FIG. 20 is a flowchart of a match processing at the time of restart processing due to a generic update.
Figure 21:
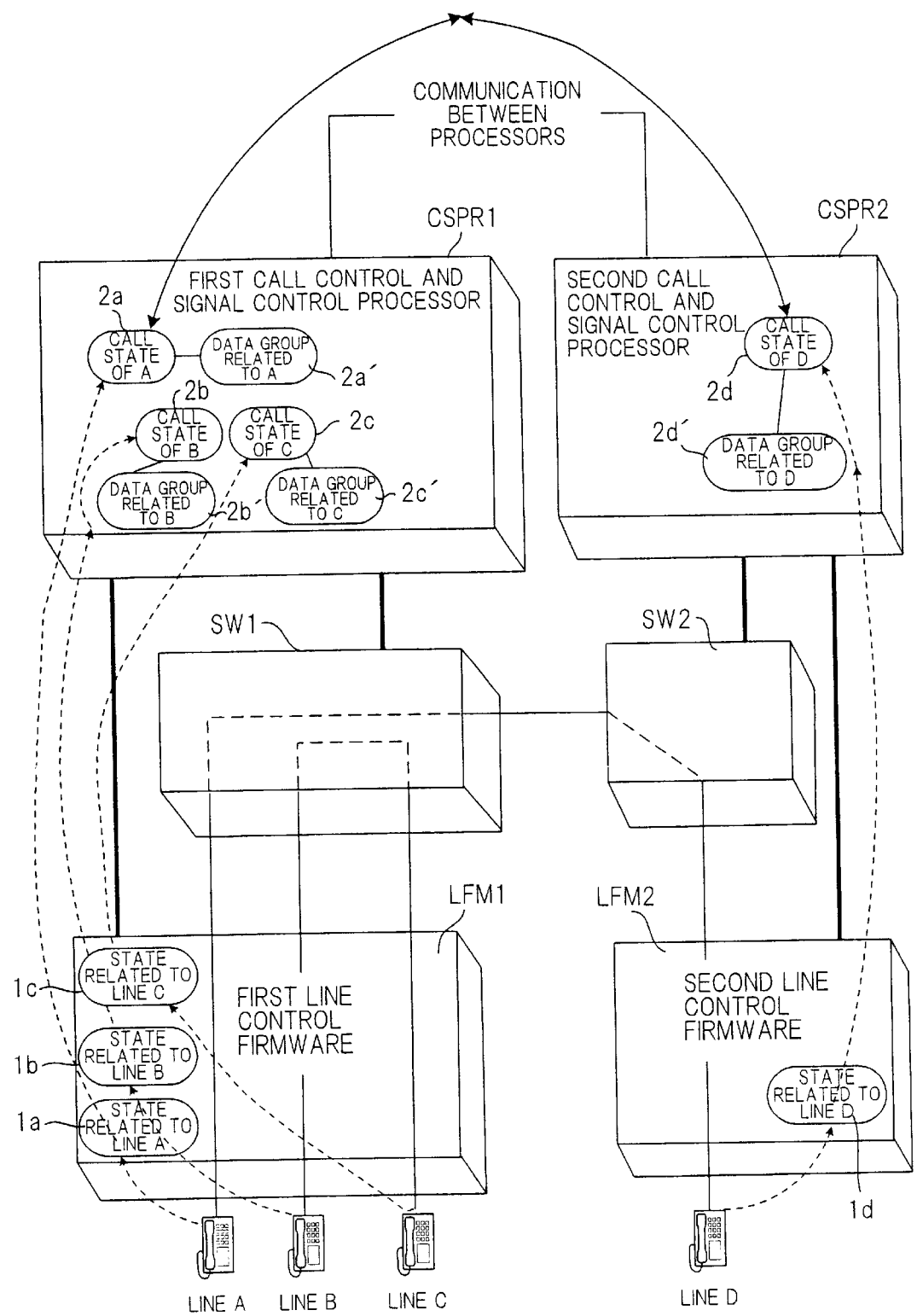
FIG. 21 shows an,example of the structure of a conventional multiprocessor exchange having no floating function.
Figure 22:
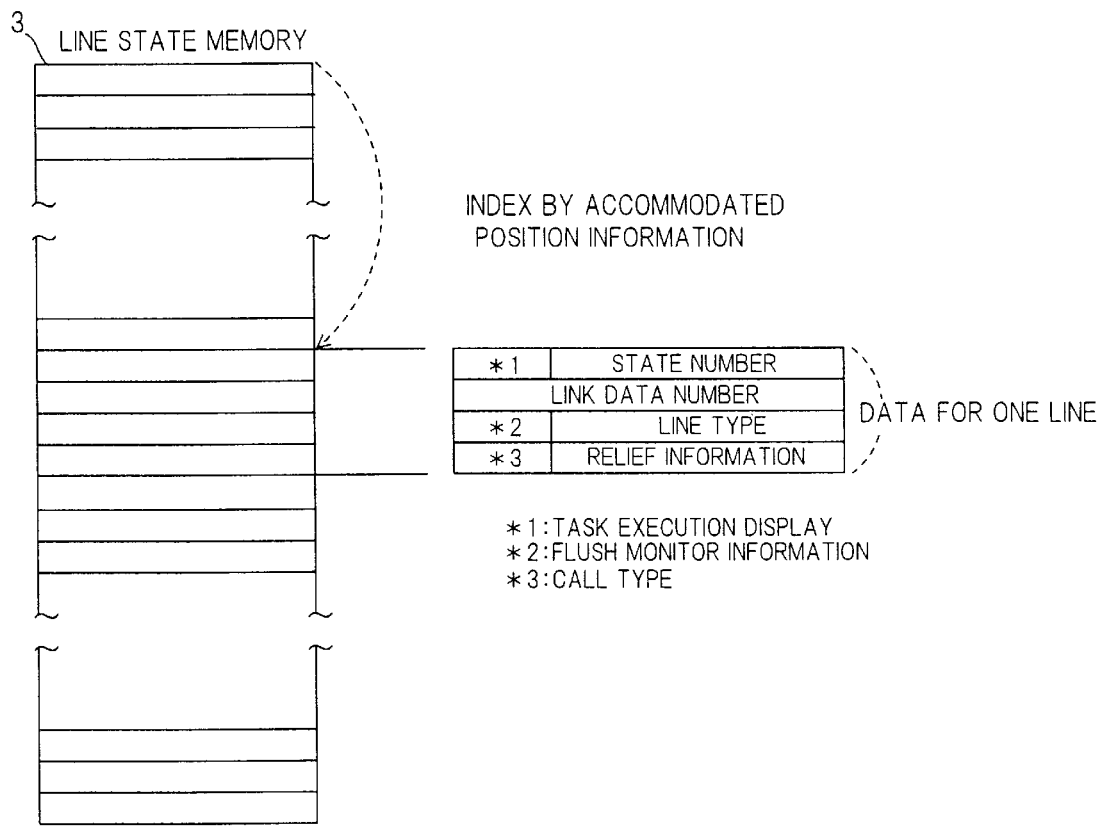
FIG. 22 shows an example of the data held by a firmware.
Figure 23:
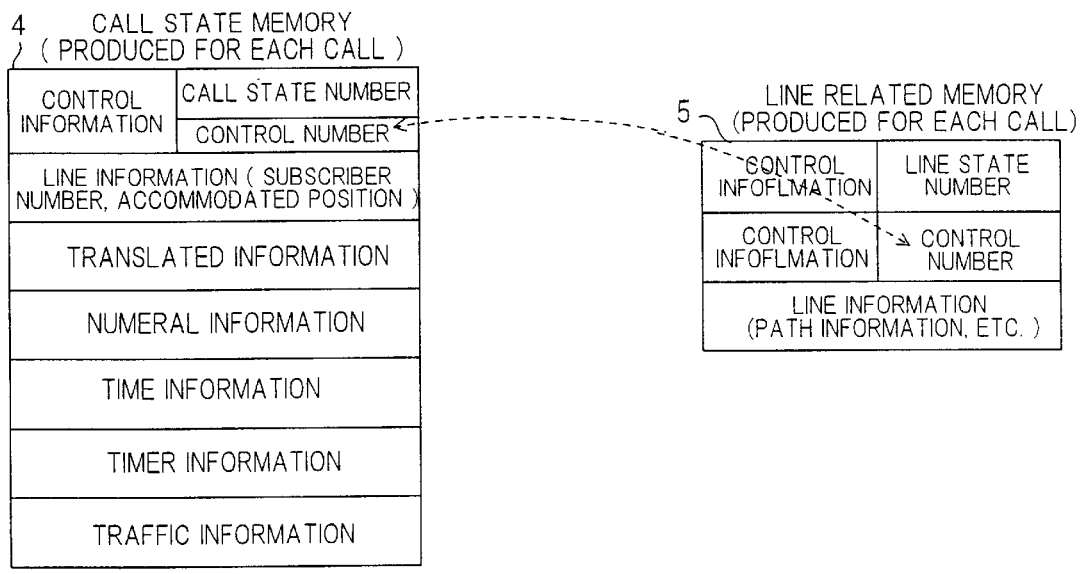
FIG. 23 shows an example of the data held by a processor.
Figure 24:
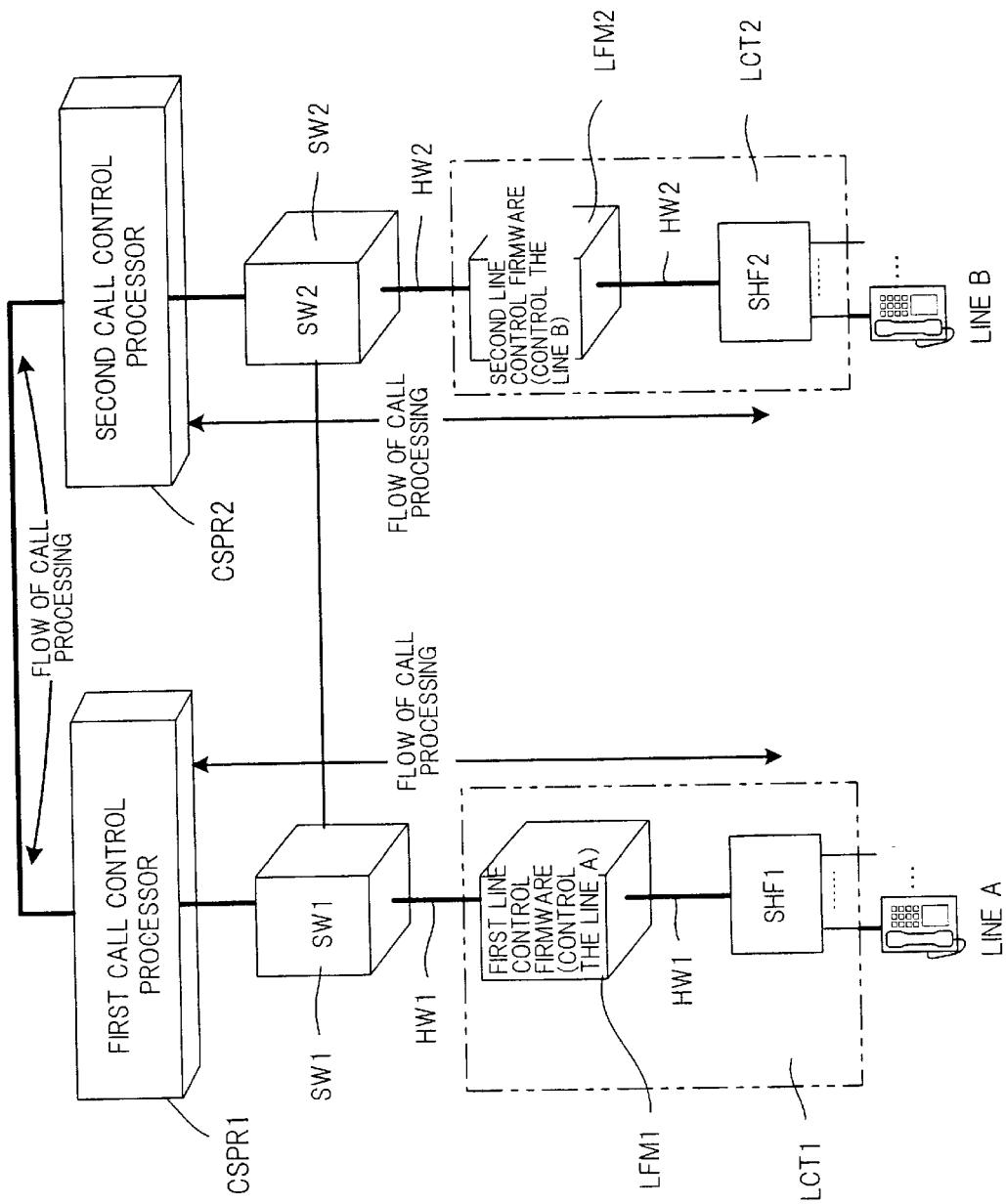
FIG. 24 shows an example of a call connection in a multiprocessor exchange having no floating function.
Figure 25:
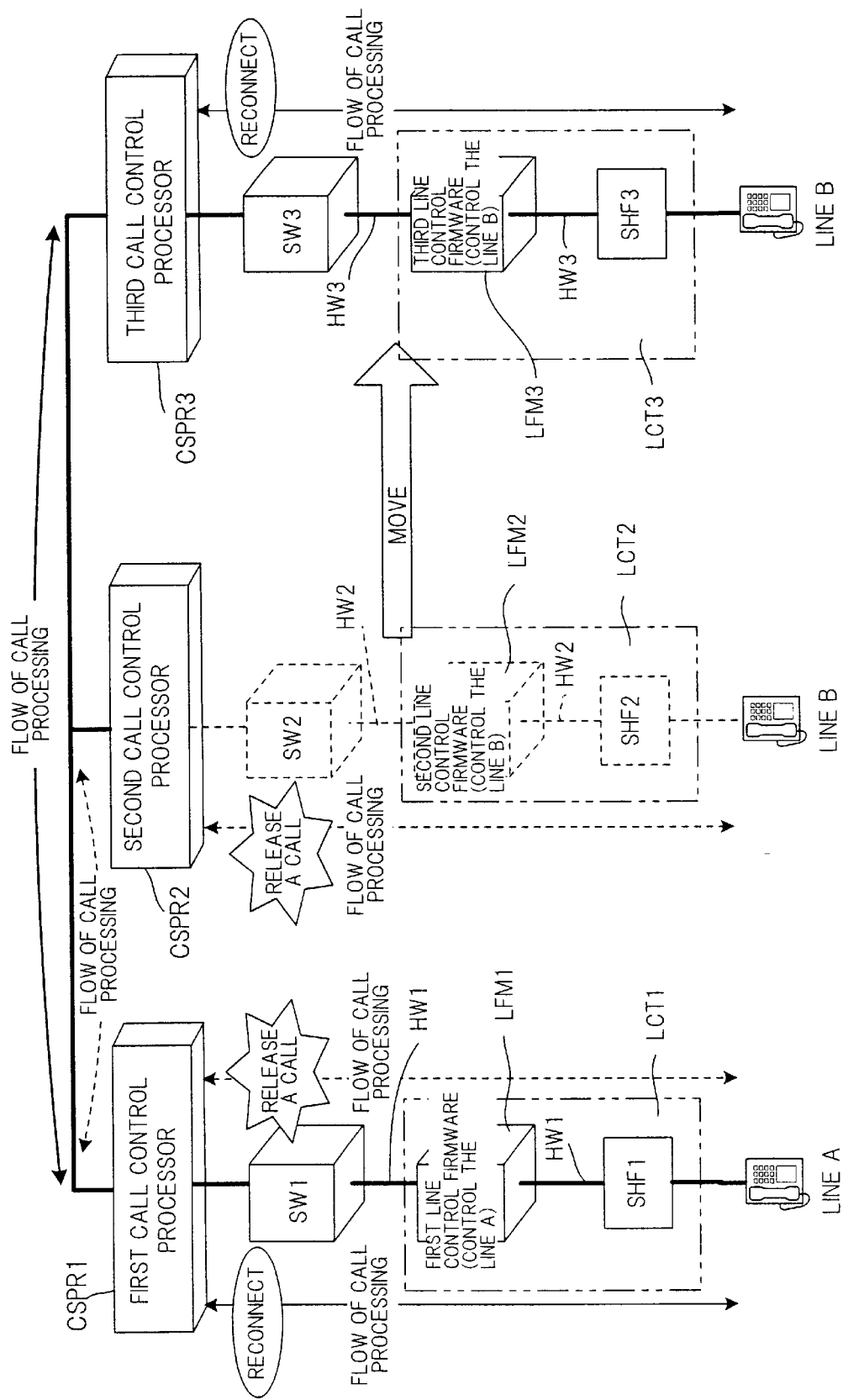
FIG. 25 shows an explanatory view of the shift of a highway in a multiprocessor exchange having no floating function.
Figure 26:
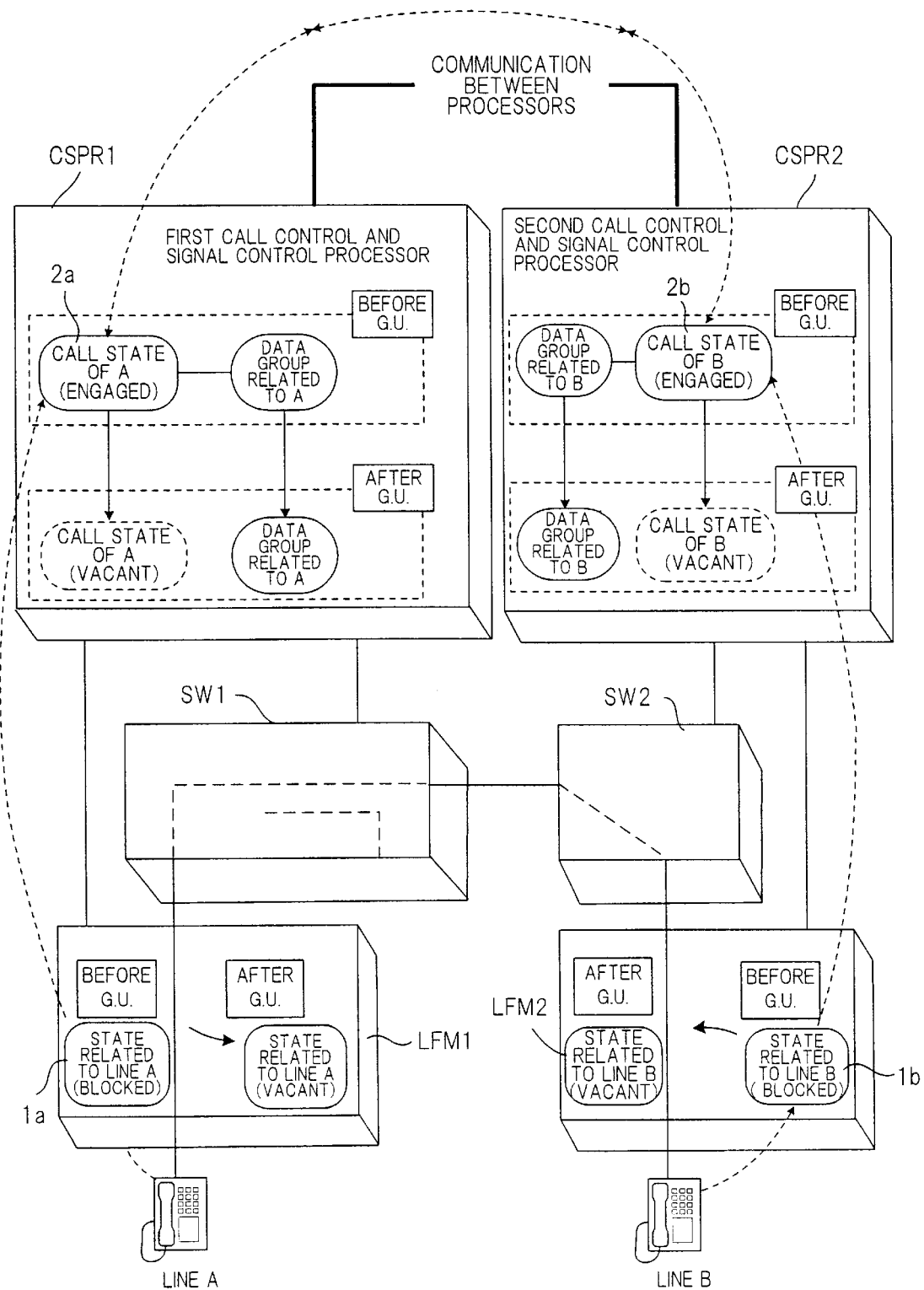
FIG. 26 is an explanatory view of the generic update in a multiprocessor exchange having no floating function.

The call control processor CPR1b executes a match processing in the "restart processing due to generic switching". The match processing is executed in a similar way to the match processing in the "restart processing with relief" shown in FIG. 7. FIG. 20 is a flowchart of the match processing in the "restart processing due to generic switching". When the restart processing due to generic switching is started (step 401), the new call control processor CPR1b finds the line or highway allocated thereto (step 402). The call control processor CPR1b then starts the match processing aimed at the relief of a stable call (step 403), releases the call related data on the the lines corresponding to a nonstable call in the match processing, and further produces non-relief information and sends the information to the line control firmware in order to relieve a stable call (step 404).

The line control firmware (1) releases the call related data on the line of a nonstable call, and (2) produces non-relief information on the line which the line control firmware judges not the object of relief even if it has a stable call and sends the information to the call control processor (step 405).

The call control processor CPR1b releases the call related data on the line designated by the non-relief information (step 406), and starts a call control (step 406). In the case of a digital subscriber (BRI/PRI), since the subscriber has a call state, the call control processor CPR1b sends a message (Status-enq) so as to execute a match processing on each subscriber individually (step 408). The processing after the step 403 is the same as the processing after the step 106 in FIG. 7.

Although detailed explanation is given in the above, in a multiprocessor exchange having a floating function according to the present invention, it is possible to use one of the call control processors as a signal distribution control processor. The hardware structure is simplified by adopting such a structure.

As described above, according to a multiprocessor exchange having a floating function of the present invention, it is possible to change the load of each call control processor without the need for changing the physical line connection.

According to the present invention, it is possible to change the load of each call control processor simply by changing the line allocation information which specifies a line to be allocated to each call control processor.

According to the present invention, a match processing aimed at the relief of a stable call (call in the course of talking or ringing) is enabled when one of the call control processor, signal distribution control processor and the line control firmware which constitutes the multiprocessor exchange having a floating function executes a "restart processing with relief".

According to the present invention, since the line or highway which is allocated to each control processor individually is specified, and a call processing is stopped/started on a line or highway irrespective of the other lines or highways, it is possible to limit the number of lines which cannot be used in the match processing at the time of "restart processing with relief" to the minimum, and further to shorten the matching time and therefore the time during which the line cannot be used, thereby enhancing the reliability of the system.

According to the present invention, it is possible to shift a line or a highway without exerting any influence (disconnection, etc.) on the subscriber during communication, thereby greatly contributing to a reduction in the call loss of the system.

According to the present invention, it is possible to transfer the data from the old system to a new system without any difference at the time of generic update, and further to avoid a forced release of a stable call at the time of generic update, so that it is possible to provide smooth information communication service including little call loss.

As many apparently widely different embodiments of the present invention can be made without departing from the spirit and scope thereof, it is to be understood that the invention is not limited to the specific embodiments thereof except as defined in the appended claims.

What is claimed is:

1. A multiprocessor exchange having a floating function provided with a call control processor for executing a call processing on the basis of call control information, a switch for transmitting a transmission signal such as a sound signal which is input through a predetermined line under the control of said call control processor to another line, and a line controller for transmitting and receiving call control information between a line and said call control processor, managing call related data, inputting transmission signal input from a line to the switch, and transmitting transmission signal input from said switch to a line, said multiprocessor exchange comprising:

a plurality of call control processors for executing call processing on the respective lines allocated thereto;

a line allocating means for logically allocating said lines to the respective call control processors; and a signal distribution control processor provided between said line controller and each of said call control processors so as to distribute said call control information on a predetermined line to the call control processor corresponding to said line by reference to the line allocation which is set by said line allocating means, and controlling said switch on the basis of the instruction from the call control processors;

wherein the call control of each line is distributed to said plurality of call control processors.

2. The mutiprocessor exchange having a floating function according to claim 1, wherein said line controller includes:

a line control hardware for executing time-division multiplex of the transmission signals from a plurality of lines and inputting the time-division multiplex signal to said switch through a highway, while separating the time-division multiplex signal input from said switch through said highway and transmitting the divided signals to said plurality of lines; and a line control firmware for executing a call control such as transmission and reception of said call control information between said line and said call control processor and management of the call related data.

3. The multiprocessor exchange having a floating function according to claim 1, wherein one of said call control processors is used as said signal distribution control processor.

4. The multiprocessor exchange having a floating function according to claim 1, wherein a plurality of said line controllers are provided; and said signal distribution control processor distributes call control information directed from a call control processor to a predetermined line to a line controller to which said line is connected.

5. The multiprocessor exchange having a floating function according to claim 4, wherein a plurality of said signal distribution control processors are provided; and each of said call control processors inputs said call control information on a predetermined line to a line controller to which said line is connected through a predetermined signal distribution control processor.

6. The multiprocessor exchange having a floating function according to claim 2, wherein said line allocating means collectively allocates said lines to each of said call control processors on a highway basis.

7. The multiprocessor exchange having a floating function according to claim 1, wherein each of said call control processors for executing a call processing is changed by changing the line allocation by said line allocating means.

8. The multiprocessor exchange having a floating function according to claim 1, wherein each of said call control processors requires the line controller to which the lines allocated thereto are connected to stop the call control on said lines individually per line basis or collectively per highway basis at the time of match processing in restart processing which is executed when an abnormality is detected, and requires said lines to start said call control after the end of said match processing.

9. The multiprocessor exchange having a floating function according to claim 1, wherein each of said call control processors requires the line controller to which the lines allocated thereto are connected to stop the call control on said lines at the time of restart processing which is executed when an abnormality is detected;

a line control firmware provided in said line controller stops said call control on the designated line;

said call control processor then (1) starts a match processing aimed at the relief of a stable call on said lines allocated thereto, and releases the call related data on the line corresponding to a nonstable call in said match processing, and (2) produces relief information and sends said information to said line control firmware in order to relieve said stable call;

said line control firmware (1) releases the call related data on the line which is not designated in said relief information, and (2) produces non-relief information on the line which said line control firmware does not judge as the object of relief even if said line is designated in said relief information, and sends said non-relief information to said call control processor;

said call control processor releases the call related data on said line designated in said non-relief information, and when said match processing is finished, said call control processor requires said line controller to start the call control on the line which has been stopped; and said line control firmware starts said call control on the designated line.

10. The multiprocessor exchange having a floating function according to claim 9, wherein, when a plurality of signals are input from a plurality of lines to a switch through a highway in the form of time-division multiplex signals, and said time-division multiplex signals are separated and transmitted from said switch to said lines through said highway, each of said call control processors requires said line control firmware to stop or start said call control on said lines collectively per highway basis.

11. The multiprocessor exchange having a floating function according to claim 1, wherein, when a line allocated to a first call control processor which is executing call processing is shifted to a second call control processor, said first call control processor transfers the call control information on said line which is held thereby to said second call control processor before the shift; and said second call control processor executes a match processing after the shift, and thereafter starts said call control.

12. The multiprocessor exchange having a floating function according to claim 11, wherein said second call control processor (1) starts said match processing aimed at the relief of a stable call on said lines allocated thereto after said shift, and releases the call related data on the line corresponding to a nonstable call in said match processing, and (2) produces relief information and sends said information to said line controller in order to relieve said stable call;

a line control firmware provided in the line controller (1) releases the call related data on the line which is not designated in said relief information, (2) produces non-relief information on the line which said line control firmware does not judge as the object of relief even if said line is designated in said relief information, and sends said non-relief information to said call control processor; and said call control processor releases the call related data on said line designated in said non-relief information, and starts said call control.

13. The multiprocessor exchange having a floating function according to claim 1, wherein said call control processor comprises an active call control processor and a standby call control processor so that each call control processor updates an old file held therein to a new file, and thereafter said call control is shifted from said active call control processor to said standby call control processor as a new call control processor;

said new call control processor executes a restart processing, and requires the line controller to which the lines allocated thereto are connected to stop said call control of said lines in said restart processing;

a line control firmware provided in said line controller stops said call control on the designated lines;

said new call control processor then (1) starts match processing aimed at the relief of a stable call on said lines allocated thereto, and releases the call related data on the line corresponding to a nonstable call in said match processing, and (2) produces relief information and sends said information to said line control firmware in order to relieve said stable call;

said line control firmware (1) releases the call related data on the line which is not designated in said relief information, (2) produces non-relief information on the line which said line control firmware does not judge as the object of relief even if said line is designated in said relief information, and sends said non-relief information to said new call control processor;

said new call control processor releases the call related data on said line designated in said non-relief information, and requires said line controller to start said call control of said line allocated thereto after the end of said match processing; and said line control firmware starts said call control of the designated line.

14. The multiprocessor exchange having a floating function according to claim 1, wherein said signal distribution control processor requires the line controller under its own control to stop the call control by designating lines at the time of restart processing which is executed when an abnormality is detected, and then reports that the restart processing has been started to the other processors including call control processors;

a line control firmware provided in said line controller stops said call control of the designated lines;

each of said call control processors (1) obtains the lines allocated thereto among the lines which are connected to said signal distribution control processor, and (2) releases the call related data on the line which corresponds to a nonstable call among the obtained lines, and further produces relief information in order to relieve a stable call and sends said information to said line control firmware of the line controller to which said lines allocated thereto are connected;

said line control firmware which has received said relief information from said call control processor (1) releases the call related data on the line which is not designated in said relief information among the lines which are allocated to said call control processor, and (2) produces non-relief information on the line which said line control firmware does not judge as the object of relief even if said line is designated in said relief information, and sends said non-relief information to said call control processor;

said call control processor releases the call related data on said line designated in said non-relief information, and then said call control processor requires said line controller to start the call control on said lines which has been stopped; and said line control firmware starts said call control on the designated lines.

15. The multiprocessor exchange having a floating function according to claim 14, wherein, when a plurality of signals are input from a plurality of lines to a switch through a highway in the form of time-division multiplex signals, and said time-division multiplex signals are separated and transmitted from said switch to said lines through said highway, said signal distribution control processor requires said line controller to stop said call control on said lines collectively per highway basis.

16. The multiprocessor exchange having a floating function according to claim 1, wherein a line control firmware provided in said line controller stops said call control on the lines under its own control at the time of restart processing which is executed when an abnormality is detected, and then reports that said line control firmware has started the restart processing to the host signal distribution control processor;

said signal distribution control processor reports that the subordinate line control firmware has started the restart processing to the other processors;

each of said call control processors (1) obtains the lines allocated thereto among the lines which said line control firmware controls, and (2) releases the call related data on the line which corresponds to a nonstable call among said lines allocated thereto, and further produces relief information in order to relieve a stable call and sends said information to said line control firmware;

said line control firmware which has received said relief information from said call control processor (1) releases the call related data on the line which is not designated in said relief information among the lines which are allocated to said call control processor, and (2) produces non-relief information on the line which said line control firmware does not judge as the object of relief even if said line is designated in said relief information, and sends said non-relief information to said call control processor;

said call control processor releases the call related data on said line designated in said non-relief information, and then said call control processor requires said line controller to start said call control on said lines which has been stopped, and said line control firmware starts said call control on the designated lines.

17. The multiprocessor exchange having a floating function according to claim 16, wherein, when a plurality of signals are input from a plurality of lines to a switch through a highway in the form of time-division multiplex signals, and said time-division multiplex signals are separated and transmitted from said switch to said lines through said highway, said line control firmware stops said call control on said lines collectively per highway basis.

* * * * *